United States Patent
Johnson, Jr. et al.

(10) Patent No.: US 12,271,498 B2
(45) Date of Patent: Apr. 8, 2025

(54) GRAPH-BASED DATA COMPLIANCE USING NATURAL LANGUAGE TEXT

(71) Applicant: Optum, Inc., Minnetonka, MN (US)

(72) Inventors: Donald E. Johnson, Jr., Newton, NJ (US); Somadev Pasala, Montclair, NJ (US); Ravi Kondadadi, Lakeville, MN (US); Hadi D. Halim, Kendall Park, NJ (US); Ramin Anushiravani, San Carlos, CA (US); Ayush Tomar, Morgan Hill, CA (US); Adam Russell, Arlington, MA (US); Robert K. Rossmiller, Brookfield, WI (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/452,768

(22) Filed: Aug. 21, 2023

(65) Prior Publication Data
US 2025/0068755 A1    Feb. 27, 2025

(51) Int. Cl.
*G06F 21/62* (2013.01)
*G06F 16/28* (2019.01)

(52) U.S. Cl.
CPC ........ *G06F 21/6218* (2013.01); *G06F 16/288* (2019.01)

(58) Field of Classification Search
CPC .......................... G06F 16/288; G06F 21/6218
See application file for complete search history.

(56) References Cited

U.S. PATENT DOCUMENTS

| | | |
|---|---|---|
| 10,572,684 B2 | 2/2020 | Lafever et al. |
| 10,719,487 B2 | 7/2020 | Nivala et al. |
| 10,867,351 B1 | 12/2020 | Vadaparty et al. |

(Continued)

FOREIGN PATENT DOCUMENTS

| | | |
|---|---|---|
| CN | 103744846 A | 4/2014 |
| CN | 105431839 A | 3/2016 |

(Continued)

OTHER PUBLICATIONS

"3 Contract Metadata Extraction Best Practices", Ironclad, (7 pages), Apr. 6, 2023, https://ironcladapp.com/journal/contract-data/contract-metadata-extraction.

(Continued)

*Primary Examiner* — Dangelino N Gortayo
(74) *Attorney, Agent, or Firm* — Alston & Bird LLP

(57) ABSTRACT

Various embodiments of the present disclosure provide automated data compliance techniques for complex access controlled datasets subject to a plurality of data access constraints. Some of the techniques may include generating, using one or more natural language models, entity-relationship data for an access controlled dataset and generating a knowledge graph based on the entity-relationship data. The knowledge graph includes a plurality of vertices connected by a plurality of edges that may be traversed to identify a data access condition indicative of a data access violation or a data coverage violation. Some of the techniques may include generating, using the knowledge graph, a natural language condition description based on the data access condition and providing a condition alert indicative of the natural language condition description.

20 Claims, 13 Drawing Sheets

(56) References Cited

U.S. PATENT DOCUMENTS

| | | |
|---|---|---|
| 11,481,412 B2 | 10/2022 | Swamy et al. |
| 2004/0059611 A1 | 3/2004 | Kananghinis et al. |
| 2004/0117358 A1 | 6/2004 | Von et al. |
| 2012/0046978 A1 | 2/2012 | Cartwright |
| 2012/0102050 A1 | 4/2012 | Button et al. |
| 2012/0324347 A1 | 12/2012 | Monroe et al. |
| 2014/0117358 A1 | 5/2014 | Tobita |
| 2014/0244325 A1 | 8/2014 | Cartwright |
| 2014/0258172 A1 | 9/2014 | Roach |
| 2015/0193630 A1 | 7/2015 | Von Kaenel et al. |
| 2018/0101779 A1* | 4/2018 | Canim .................. G06N 5/046 |
| 2019/0278777 A1* | 9/2019 | Malik ................. G06F 16/9024 |
| 2019/0354544 A1* | 11/2019 | Hertz .................... G06N 5/025 |
| 2020/0090079 A1 | 3/2020 | Wang |
| 2020/0117678 A1 | 4/2020 | Woodings et al. |
| 2020/0250663 A1 | 8/2020 | Abad et al. |
| 2021/0097052 A1* | 4/2021 | Hans ..................... G06N 5/022 |
| 2021/0192651 A1 | 6/2021 | Groth et al. |
| 2021/0398136 A1 | 12/2021 | Cebertowicz et al. |
| 2022/0172208 A1 | 6/2022 | Cella et al. |
| 2022/0318399 A1 | 10/2022 | Rodler et al. |
| 2023/0029190 A1 | 1/2023 | Gomez |
| 2023/0059494 A1 | 2/2023 | Hunter |
| 2023/0064537 A1 | 3/2023 | Slavin et al. |
| 2023/0245651 A1* | 8/2023 | Wang .................... G06N 5/022 704/275 |

FOREIGN PATENT DOCUMENTS

| | | |
|---|---|---|
| EP | 3500981 A1 | 6/2019 |
| EP | 4160490 A2 | 4/2023 |
| WO | 2018/035211 A1 | 2/2018 |

OTHER PUBLICATIONS

Amaral, Orlando et al., "AI-Enabled Automation for Completeness Checking of Privacy Policies", IEEE Transactions on Software Engineering, vol. 48, No. 11, (28 pages), Nov. 11, 2022.

Extended European Search Report for European Patent Application No. 17842048.5, Mar. 23, 2020, (8 pages), European Patent Office, Munich, Germany.

International Search Report and Written Opinion for PCT Application No. PCT/US2017/047120, dated Nov. 7, 2017, 10 pages, United States Patent and Trademark Office, US.

Kwok, Thomas et al., "An Automatic Method to Extract Data from an Electronic Contract Composed of a Noumber of Documents in PDF Format", Proceedings of the 8th IEEE International Conference on E-Commerce Technology and the 3rd IEEE International Conference on Enterprise Computing, E-Commerce, and E-Services, (5 pages), 2006, https://dominoweb.draco.res.ibm.com/reports/rc24083.pdf.

\* cited by examiner

{0: {'title': {'content' : 'Information technology systems must be configured,'
'operated, and managed in a controlled manner to '
'help ensure the confidentiality,integrity, and '
'availability of UnitedHealth Group and its Business '
'Organizations hereafter referred to as Company or '
'the Companyinformation.Safeguards must be in place '
'to protect the Companys computing environment from '
'malicious code e.g., viruses, and '
'informationtechnology systems must be regularly '
'backed up to ensure timely recovery in the event of '
'an operational outage.Company information '
'technology systems include, but are not limited to '
'information technology systems, infrastructure,'
'equipmentsuch as telephone, voicemail, pagers,'
'hardware, software, as well as usage of Company '

FIG. 4A

```
'information technology systems andelectronic '
'communications such as email, intranet, Internet, '
'and networks, such as topology, protocol, and '
'architecture hereafterreferred jointly as Company '
'information technology systems.Company information '
'includes information and data about our Workforce, '
'people we serve and confidential information about '
'theCompany.Workforce or Workforce Members include '
'Company employees and other non employee workers '
'such as third partycontractors, service '
'professionals, and temporary staff. UnitedHealth '
'Group employees and non employee workers will be '
'collectivelyreferred to as Workforce or Workforce '
'Member although the use of the term does not '
'establish a labor relationship with theCompany.For '
'environments, which are in scope for Payment Card '
'Industry PCI, please refer to 13D PCI Security for '
'additional requirements.Description', heading': {},
```

```
1: {'title': {'value': '5A Operations Security 8.1'},
   'heading': {},
   'content': 'Information technology systems must be configured, operated, and managed in a controlled manner to help ensure theconfidentiality, integrity, and availability of Company information.Area Statement',
   'heading1': {'value': '5A.1 Operational Management and Controls'},
    sub_heading1': {},
   'content' : 'General Operational Management and Control Requirements. Section Introduction',
      'sub_heading1': {'value': '5A.1.01 Operational Management and Controls General Guidance'},
         'sub_sub_heading': {},
         'content': 'Company information systems will have date and time settings synchronized with an Enterprise Information Security EIS approved centralized network time service.For more information on logging specific requirements, see 6A Logging and Monitoring.Statement',
         'sub_sub_heading1': {'value': '5A.1.01.01 System Clocks'},
            'sub_sub_sub_heading': {},
            'content': 'Information technology systems must be installed in compliance with physical and environmental standards and configuredin accordance with Company security baselines. In the event that a security configuration benchmark, baseline, or guidedoes not exist or does n
```

FIG. 4B ot address a specific setting, systems must be hardened in accordance with 5A.3.08 SystemHardening.Information technology systems must be properly reviewed and security features must be tested by the supportingCompany information technology support organization before being installed into the Company production environment.The changes must be performed in accordance with the applicable change management process.Information technology systems must display approved logon banners to users during the logon process.Statement'},
  'sub_sub_heading2': {'value': '5A.1.01.02 Implementing Information Systems',
    'sub_sub_sub_heading': {},
    'content': 'For more information, see 5H Infrastructure Security Validation.This is a published draft. Compliance is required on or before September 1, 2021 9 1 2021Controls must be in place to prevent the implementation of unauthorized code into production environments. Technicalsolutions to enable code migration are preferred.If using a CI CD pipeline i.e., continuous integration continuous deployment, require dual control within the pipeline tovalidate and approve production code releases.Logical separation of duties, or having an immutable i.e., unchangeable file structure in production are acceptable ways toprevent unauthorized code migration into production environments.If none of the previous methods can be used, an alert must be generated when changes to production code are performedoutside of an approved change timeframe. Alerts must be monitored, and an operational process must be in place torespond to alerts.Development and deployment activities performed by individuals in operational roles must be managed via the following * Development and deployment activities correlate to an approved change request,* Access credentials are managed by a secrets management platform,* Access is time based with limited access TBLA, and* Development and deployment activities are logged.Statement'},

FIG. 4B CONT.

GRAPH-BASED DATA COMPLIANCE USING NATURAL LANGUAGE TEXT

BACKGROUND

Various embodiments of the present disclosure address technical challenges related to data usage compliance given limitations of existing compliance monitoring and enforcement techniques. Traditionally datasets are subject to contractual and regulatory requirements on privacy and data usage that are defined, in natural language text, by one or more distinct third parties, such as governing bodies, corporate entities, and/or the like. Such requirements may overlap and form complex webs of relationships between different entities associated with a dataset that are difficult to map and subsequently track and enforce. Traditional techniques for monitoring data access constraints, such as contractual and/or regulatory requirements on privacy and data usage, rely on manual processes that implement a variety of complementary tools. Such techniques are expensive, time consuming, and fail to account for overlapping relationships between different data access constraints across a dataset. Due in part to the complexity and form of data access constraints, there are no reliable automated techniques for (i) extracting data entities and metadata related to data access constraints from natural language text, (ii) mapping the interconnected relationships between the data access constraints, or (iii) detecting/reporting violations of data access constraints based on data access logs. This leads to noncompliance of data access constraints, obfuscation of multiple/complex data lineage pathways, difficulty in quantifying addressable data assets that may be exploited for new analytics/model creation, and increased turnaround time for conducting data compliance audits. Various embodiments of the present disclosure make important contributions to various existing data compliance approaches by addressing these technical challenges.

BRIEF SUMMARY

Various embodiments of the present disclosure disclose data compliance techniques for improved data access compliance mapping, monitoring, and alerting using natural language text. Traditional data compliance techniques rely on a combination of manual effort and software tools to monitor and enforce data compliance and, as a result, fail to holistically evaluate data compliance for data access constraints in view of a plurality of data access constraints that apply to a dataset. Some techniques of the present disclosure address these technical disadvantages by providing improved data access compliance mapping techniques that generate, using natural language models, entity-relationship data from natural language text and then generate a knowledge graph using the entity-relationship data. Using some of the techniques of the present disclosure, the knowledge graph may be leveraged to monitor data activity patterns and detect data access violations in real time. By doing so, some of the techniques of the present disclosure may automate and improve the responsiveness of data compliance for comprehensive datasets subject to a plurality of complex, interrelated data access constraints. As described herein, some of the techniques of the present disclosure may be practically applied to enforce data access constraints in real time and simulate the addition, modification, and/or removal of data access constraints on a dataset.

In some embodiments, a computer-implemented method includes generating, by one or more processors and using one or more natural language models, entity-relationship data for an access controlled dataset, wherein the entity-relationship data is indicative of one or more data access constraints for a plurality of dataset entities associated with the access controlled dataset; generating, by the one or more processors, a knowledge graph based on the entity-relationship data, wherein the knowledge graph comprises a plurality of vertices connected by a plurality of edges, wherein a vertex of the plurality of vertices is indicative of a dataset entity of the plurality of dataset entities and an edge of the plurality of edges is indicative of a potential interaction between two dataset entities of the plurality of dataset entities; identifying, by the one or more processors and using the knowledge graph, a data access condition indicative of a data access violation or a data coverage violation; generating, by the one or more processors and using the knowledge graph, a natural language condition description based on the data access condition; and providing, by the one or more processors, a condition alert indicative of the natural language condition description.

In some embodiments a computing system includes a memory and one or more processors communicatively coupled to the memory. The one or more processors are configured to generate, using one or more natural language models, entity-relationship data for an access controlled dataset, wherein the entity-relationship data is indicative of one or more data access constraints for a plurality of dataset entities associated with the access controlled dataset; generate a knowledge graph based on the entity-relationship data, wherein the knowledge graph comprises a plurality of vertices connected by a plurality of edges, wherein a vertex of the plurality of vertices is indicative of a dataset entity of the plurality of dataset entities and an edge of the plurality of edges is indicative of a potential interaction between two dataset entities of the plurality of dataset entities; identify, using the knowledge graph, a data access condition indicative of a data access violation or a data coverage violation; generate, using the knowledge graph, a natural language condition description based on the data access condition; and provide a condition alert indicative of the natural language condition description.

In some examples, one or more non-transitory computer-readable storage media including instructions, when executed by one or more processors, cause the one or more processors to generate, using one or more natural language models, entity-relationship data for an access controlled dataset, wherein the entity-relationship data is indicative of one or more data access constraints for a plurality of dataset entities associated with the access controlled dataset; generate a knowledge graph based on the entity-relationship data, wherein the knowledge graph comprises a plurality of vertices connected by a plurality of edges, wherein a vertex of the plurality of vertices is indicative of a dataset entity of the plurality of dataset entities and an edge of the plurality of edges is indicative of a potential interaction between two dataset entities of the plurality of dataset entities; identify, using the knowledge graph, a data access condition indicative of a data access violation or a data coverage violation; generate, using the knowledge graph, a natural language condition description based on the data access condition; and provide a condition alert indicative of the natural language condition description.

BRIEF DESCRIPTION OF DRAWINGS

FIG. 4A is an operational example of a data compliance rule in accordance with some embodiments discussed herein.

FIG. 4B is an operational example of a data compliance rule in accordance with some embodiments discussed herein.

DETAILED DESCRIPTION

Figure 1:
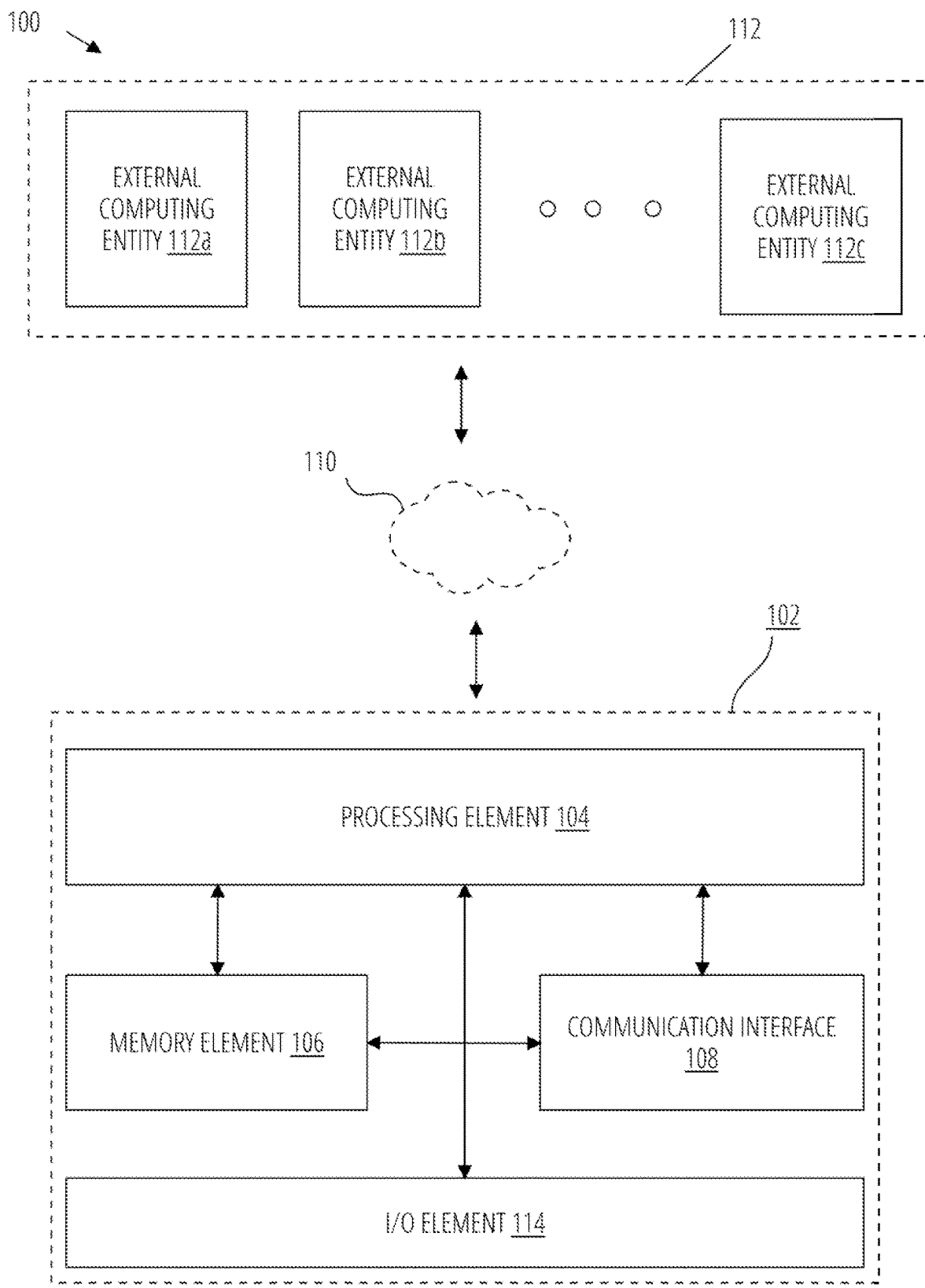
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop (s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., data compliance techniques, compliance enforcement techniques, and/or the like) described herein.

The external computing entities 112a-c, for example, may include and/or be associated with one or more data sources configured to receive, store, manage, and/or facilitate one or more data controlled datasets, natural language texts, and/or the like. The external computing entities 112a-c, for example, may provide the access to the data to the predictive computing entity 102 through data controlled datasets. By way of example, the predictive computing entity 102 may include a compliance platform that is configured to leverage data from the external computing entities 112a-c and/or one or more other data sources to develop, maintain, and/or execute a data access compliance scheme. In some examples, the operations of the predictive computing entity 102 may leverage one or more natural language texts provided by one or more of the external computing entities 112a-c to generate a knowledge graph for monitoring data access patterns to access controlled datasets. The external computing entities 112a-c, for example, may be associated with one or more data repositories, cloud platforms, compute nodes, organizations, and/or the like, that may be individually and/or collectively leveraged by the predictive computing entity 102 to obtain and aggregate natural language texts, access controlled dataset, and/or any other compliance information regarding various entities.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
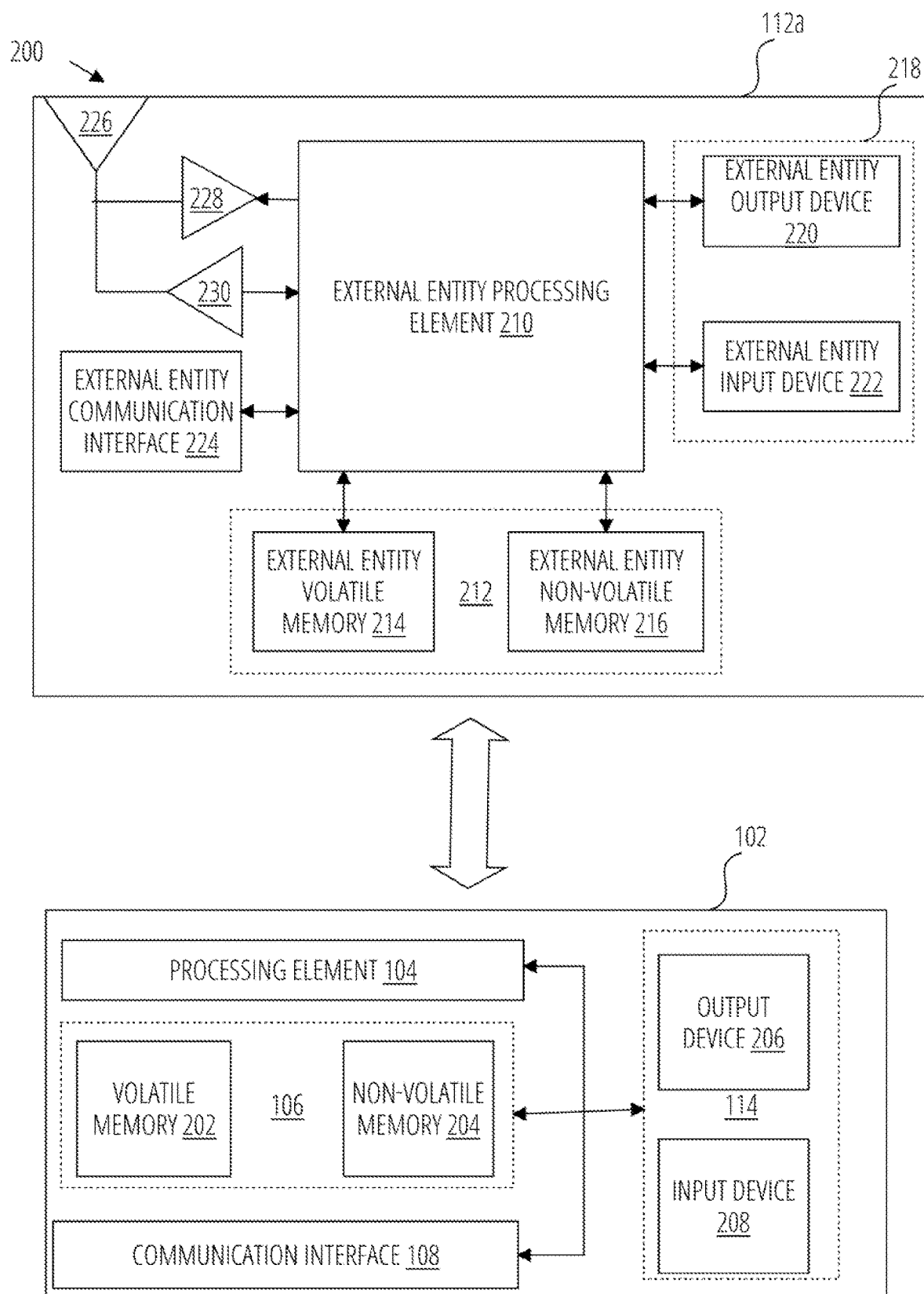
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include one or more external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments May be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. EXAMPLES OF CERTAIN TERMS

In some embodiments, the term "access controlled dataset" refers to a data entity that describes data subject to one or more data access constraints. An access controlled dataset, for example, may include a plurality of data segments, such as data tables, data objects, data catalogs, and/or the like, that may be accessed by one or more entities. The data segments of the access controlled dataset may include information that may be subject to different data access constraints based on the sensitivity, confidentiality, and/or any other characteristic that may impact an availability of the data segment. For example, an access controlled dataset may include data segments that are indicative of confidential information that is protected by one or more internal confidentiality policies that govern a user's access to the confidential information. As another example, access controlled dataset may include data segments that are indicative of sensitive user information, such as personally identifiable information (PII), that is protected by one or more external privacy policies that govern a user's access to the sensitive user information. As described herein, an access controlled dataset may include any number of data segments that each may be associated with any number of different data access constraints.

In some embodiments, the term "data access constraint" refers to a constraint on access to one or more data segments of an access controlled dataset. A data access constraint may be indicative of one or more data obligations, usage rights, operations, and/or the like, for a data segment from an access controlled dataset. A data access constraint, for example, may be indicative of a restriction on the accessibility of a data segment by a particular person/organization, from a particular location, for a particular purpose, at a particular time, and/or the like. In some examples, a data access constraint may be defined by natural language text.

In some embodiments, the term "natural language text" refers to a data entity that describes one or more data access constraints. A natural language text may include a natural language document, phrase, record, and/or any other representation of natural language. A natural language text may include a unit of natural language that defines one or more attributes of one or more data access constraints. For instance, a natural language text may include one or more regulatory documents, policy manuals, technical specifications, organizational charts, and/or the like. In some examples, a natural language text may define a data access constraint in natural language. In some examples, a natural language text may define an attribute (e.g., a data entity, relationship between data entities, etc.) of a data access constraint.

In some embodiments, the term "natural language model" refers to a data entity that describes parameters, hyperparameters, and/or defined operations of a rules-based, statistical, and/or machine learning model (e.g., model including at least one of one or more rule-based layers, one or more layers that depend on trained parameters, coefficients, and/or the like). For instance, a natural language model may include a language model that is trained to extract entity-relationship data from natural language text. In some examples, a natural language model may include a machine learning model including one or more supervised, unsupervised, semi-supervised, reinforcement learning models, and/or the like. In some examples, a natural language model may include multiple models configured to perform one or more different stages of a natural language interpretation process. As one example, a natural language model may include a natural language processor (NLP) configured to extract entity-relationship data from natural language text. The NLP may include any type of natural language processor including, as examples, support vector machines, Bayesian networks, maximum entropies, conditional random fields, neural networks, and/or the like.

In some embodiments, the term "entity-relationship data" refers to a data entity that describes information extracted from natural language text. For example, entity-relationship data may include one or more data compliance rules and/or one or more attributes for one or more data compliance rules. For instance, entity-relationship data may be indicative of one or more data entities, potential interactions, and/or metadata thereof (e.g., a number of occurrences of the data entities, etc.) from a natural language text.

In some embodiments, the term "data compliance rule" refers to a data entity that describes a structured language representation of a data access constraint. For example, a data compliance rule may include a structured language rule extracted from natural language text. The data compliance rule may include a plurality of nouns, a plurality of verbs, and/or a plurality of adjectives. Each of the nouns, verbs, and/or adjectives may be extracted from natural language text and/or transformed from one or more counterpart nouns, verbs, and/or adjectives extracted from natural language text. In some examples, the plurality of nouns may correspond to one or more dataset entities. In some examples, the plurality of verbs and/or adjectives may correspond to one or more potential interactions between the dataset entities.

In some embodiments, the term "time stamp" refers to an attribute of a data compliance rule. A time stamp may be indicative of an effective time range for a data compliance rule. For example, the time stamp may be indicative of an effective start date, an effective end date, an effective modification date, and/or the like for a data compliance rule.

In some embodiments, the term "dataset entity" refers to a data entity that describes an object associated with an access controlled dataset. For example, a dataset entity may be a data access constraint, a data segment, and/or one or more recognized nouns from a natural language text. For example, a plurality of dataset entities may be generated from a corpus of natural language text, a recognized ontology, and/or any other information that is related to one or more locations, data sources, programs, and/or the like associated with an access controlled dataset. In some examples, a dataset entity may include one or more hierarchical entities that are indicative of one or more nested entity relationships. A hierarchical entity, for example, may include a hierarchical organization, a hierarchical geographic location, and/or the like. A hierarchical organization, for instance, may include a plurality of organization entities in which first organization entity has a parent and/or child relationship with a second organization entity. A hierarchical geographic location may include a plurality of location entities in which first location entity has a parent and/or child relationship with a second location entity (e.g., a state location entity is located within a country location entity and is therefore child of the country location entity). As described herein, hierarchical entities may be efficiently accounted for within a graph data structure, such as a knowledge graph, through self referencing nodes, and/or the like.

In some embodiments, the term "recognized noun" refers to a data entity that describes a term from a recognized ontology. For example, a recognized noun may be associated with a recognized ontology. The recognized noun may be a term of a recognized ontology. In some examples, a recognized noun may be associated with a data entry from a recognized ontology that describes metadata, such as one or more attributes, synonyms, descriptions, and/or the like for the recognized noun.

In some embodiments, the term "recognized ontology" refers to a data entity that describes a standardized ontology of recognized nouns for a dataset. A recognized ontology, for example, may include a corpus of terms (e.g., nouns, etc.) and/or metadata for each of the terms. A corpus of terms may be aggregated from one or more data sources of a prediction domain to generate a holistic recognized ontology of terms for a prediction domain. For example, in a clinical prediction domain, a recognized ontology may include a corpus of terms associated with Medicaid data that may be derived from medical government data sources and/or healthcare provider data sources, and/or the like. In some examples, the recognized ontology may be modified based on one or more unrecognized nouns extracted from a natural language text.

In some embodiments, the term "term linking model" refers to a data entity that describes parameters, hyperparameters, and/or defined operations of a rules-based, statistical, and/or machine learning model (e.g., model including at least one of one or more rule-based layers, one or more layers that depend on trained parameters, coefficients, and/or the like). For instance, a term linking model may include a machine learning model that is trained to link one or more synonyms from a natural language text to a term of a recognized ontology. In some examples, a term linking model may include a machine learning model including one or more supervised, unsupervised, semi-supervised, reinforcement learning models, and/or the like. In some examples, a term linking model may include multiple models configured to perform one or more different stages of a term linking process.

In some embodiments, the term linking model includes a machine learning model that is trained to map nouns from natural language text to a term (e.g., a recognized noun) of a recognized ontology. By way of example, in a clinical prediction domain, the term linking model may be configured to link nouns extracted from clinical solution data to a recognized ontology for Medicaid data. For example, the term linking model may include a statistical shape analysis algorithm, such as the Procrustes algorithm, that is configured to generate a mapping between term embeddings (e.g., Word2Vec embeddings, BERT embeddings, USE, etc.). The term embeddings, for example, may include a vector embeddings generated for each term of a recognized ontology and each noun extracted from a natural language text. The term linking model may be trained to learn a mapping between the two embedding spaces using an alignment matrix W. W may be approximately obtained by solving with singular value decomposition. For example, a k-nearest neighbors (KNN) model may be applied to link terms from the recognized ontology to nouns extracted from a natural language text. In some examples, term linking may be limited to a subset of nouns from a natural language text. For instance, a keyword extraction model, such as YAKE, may be used to identify a subset of relevant nouns (e.g., most relevant 1000 nouns) from a natural language text for linking by the term linking model.

In some embodiments, the term "entity category" refers to a data entity that describes a label for a data entity. For example, an entity category may include one or more defined categories of recognized nouns from a recognized ontology. The entity categories, for example, may include an organization category, a person category, a regulation category, a location category, and/or the like. In some examples, an entity category may be assigned as a token to each term of a recognized ontology and/or data entity from data compliance rules.

In some embodiments, the term "classification model" refers to a data entity that describes parameters, hyperparameters, and/or defined operations of a rules-based, statistical, and/or machine learning model (e.g., model including at least one of one or more rule-based layers, one or more layers that depend on trained parameters, coefficients, and/or the like). For instance, a classification model may include a machine learning model that is trained to generate an entity category for a data entity. In some examples, a classification model may include a machine learning model including one or more supervised, unsupervised, semi-supervised, reinforcement learning models, and/or the like. In some examples, a classification model may include multiple models configured to perform one or more different stages of a term linking process.

In some embodiments, the classification model may include a deep neural network, such as a DNN Seq2Seq model trained, using one or more supervised training techniques, to generate an entity category.

In some embodiments, the term "potential interaction" refers to a data entity that describes a relationship between one or more data entities of a dataset. For example, a potential interaction may be indicative of a relationship between two data entities extracted from natural language text. A potential interaction, for example, may be indicative of an action (e.g., accessing, modifying, etc.) performed by one data entity with another data entity. In some examples, a potential interaction may be extracted from natural language text (and/or a data compliance rule) by leveraging part of speech tagging (POS tagging). For instance, POS tagging may be leveraged to extract verbs from the natural language text (and/or the data compliance rule).

In some embodiments, a potential interaction is linked to one or more dataset entities and/or a data compliance rule. For instance, a potential interaction may link extracted dataset entities with POS tagged with "regulation associated" verbs and adjectives (applies, infer, manage, control, protect, limit, approve, review, enable, prevent, restrict). The list of regulation associated verbs and adjectives may be constantly updated with manual review.

In some embodiments, the term "knowledge graph" refers to a data structure that defines a plurality of data entities and potential interactions for an access controlled dataset. For example, a knowledge graph may include a graph schema that defines a plurality of nodes and edges indicative of the plurality of data entities and/or potential interactions between the plurality of data entities. For instance, the knowledge graph may include a plurality of vertices connected by a plurality of edges. Each vertex of the plurality of vertices may be indicative of a dataset entity of the plurality of dataset entities. Each edge of the plurality of edges may be indicative of a potential interaction between two dataset entities of the plurality of dataset entities. Each vertex may be represented by a node of the graph schema and each edge may be represented by a link between two nodes. In some examples, a knowledge graph may include a vertex for each dataset entity associated with an access controlled dataset and an edge for each potential interaction defined by a plurality of data compliance rules extracted from natural language text associated with the access controlled dataset. The knowledge graph may include any type of graph data structure including a knowledge graph, a labeled property graph, and/or the like.

In some embodiments, the term "graph version" refers to an attribute of a knowledge graph. For example, a graph version may be indicative of a time version for a knowledge graph. A knowledge graph may include a plurality of vertices and edges that define a plurality of data entities and potential interactions that are in effect within a particular time range defined by the time version. For instance, the plurality of vertices and edges may be based on one or more time stamps associated with a plurality of data compliance rules extracted from a plurality of natural language texts.

In some embodiments, the term "data access condition" refers to a data entity that describes an insight associated with data access patterns for an access controlled dataset. For example, a data access condition may include a data access violation, a data coverage violation, and/or any other condition, violation, and/or the like, that is associated with one or more data access constraints (e.g., potential, historical, and/or current), an access controlled dataset, and/or one or more data access patterns thereof.

In some embodiments, the term "data access violation" refers to a data entity that describes a type of data access condition. A data access violation may be indicative of a violation of a data access constraint based on one or more access patterns of a user, and/or the like.

In some embodiments, the term "data access log" refers to a data entity that describes one or more access patterns for an access controlled dataset. A data access log may describe a plurality of historical and/or real-time data interactions. In some examples, the data access log may describe a plurality of data interactions and/or attributes associated with the plurality of data interactions. The attributes, for example, may be indicative of a timing of the data interactions.

In some embodiments, the term "data interaction" refers to a data entity that describes a particular data access event from a data access log.

In some examples, the data interaction may be associated with a time stamp. The time stamp may be a current time stamp, a historical time stamp, and/or a predicted time stamp. For example, the data interaction may include a historical data interaction associated with a historical time stamp. A historical data interaction may include a data interaction that is previously performed at a historical time period. In some examples, a historical data interaction may be associated with a historical time stamp that is indicative of a historical time corresponding to the performance of the data interaction.

In some examples, the data interaction may include a real-time data interaction. A real-time data interaction may include a data interaction that is performed within a current time period. For example, the real-time data interaction may include a data interaction that is recorded (e.g., within a data access log) in real and/or near real time. The real-time data interaction may be associated with a current time stamp.

As another example, the data interaction may include a predicted data interaction. The predicted data interaction may include a data interaction that may be performed after a current time period (e.g., based on one or more historical access patterns, etc.). The predicted data interaction may be associated with a predictive time stamp.

In some embodiments, the term "correlative vertex" refers to a data entity that describes a vertex corresponding to a data interaction. A correlative vertex, for example, may include a vertex corresponding to a data entity associated with a data interaction.

In some embodiments, the term "correlative edge" refers to a data entity that describes an edge corresponding to a data interaction. A correlative edge, for example, may include an edge corresponding to a potential interaction associated with a data interaction.

In some embodiments, the term "graph cycle" refers to a data entity that describes a vertex and/or edge pattern within the knowledge graph. A graph cycle may be indicative of a sequence of vertices and/or edges that form a continuous cycle. A graph cycle may be detected by traversing a knowledge graph using one or more correlative vertices and/or correlative edges from a data interaction. In some examples, a data access condition may be generated for a data interaction in the event that a graph cycle is detected.

In some embodiments, the term "data coverage violation" refers to a data entity that describes a type of data access condition. A data coverage violation may be indicative of a potential violation of one or more existing data access constraints based on a new, modified, deleted data access constraint, and/or the like.

In some embodiments, the term "augmented knowledge graph" refers to a simulated variation of a knowledge graph. For example, an augmented knowledge graph may include a knowledge graph that is augmented to simulate a constraint augmentation. In some examples, an augmented knowledge graph may be generated and then traversed to detect potential conflicts among a plurality of data access constraints and/or one or more constraint augmentations. A potential conflict may be represented by a data coverage violation.

In some embodiments, the term "constraint augmentation" refers to a constraint on the availability of one or more data segments. A constraint augmentation may be indicative of a new data access constraint, a modification to an existing data access constraint, and/or a removal of an existing data access constraint. A constraint augmentation may include a simulated change to one or more existing data access constraints for an access controlled dataset.

In some embodiments, the term "natural language condition description" refers to a natural language text description that describes a data access condition. A natural language condition description may include a representation of a data access condition in plain language. In some examples, a natural language condition description may be generated by translating description logic to natural language. For example, the natural language condition description may be generated based on one or more correlative vertices and/or correlative edges associated with a data access condition. In some examples, the natural language condition description may be based on one or more vertex descriptions corresponding to the one or more correlative vertices.

In some embodiments, the term "vertex description" refers to an attribute of a vertex from the knowledge graph. A vertex description, for example, may include a textual description of a data entity corresponding to a vertex of a knowledge graph.

In some embodiments, the term "generative model" refers to a data entity that describes parameters, hyper-parameters, and/or defined operations of a rules-based, statistical, and/or machine learning model (e.g., model including at least one of one or more rule-based layers, one or more layers that depend on trained parameters, coefficients, and/or the like). For instance, a generative model may include a machine learning model that is trained to generate a natural language condition description for a data access condition. In some examples, a generative model may include a machine learning model including one or more supervised, unsupervised, semi-supervised, reinforcement learning models, and/or the like. In some examples, a generative model may include multiple models configured to perform one or more different stages of a generative language process.

In some embodiments, a generative model includes an explainable model, such as an Attempto Controlled English (ACE) model. By way of example, a generative model may include an OWL verbalizer that is configured to generate a natural language condition description for a data interaction based on a recognized ontology, one or more correlative vertices and/or edges, and/or one or more descriptions thereof. In addition, or alternatively, a generative model may include a large language model (LLM) that may be configured to enhance ACE through in-context learning and/or prompt engineering.

In some embodiments, the term "condition alert" refers to a data entity that describes a data access condition. A condition alert may include a computing output, such as one or more control instructions, a user interface message, and/or the like, that is indicative of the data access condition. In some examples, the condition alert may include a work order. For instance, a condition alert may include an automatically generated, natural language work order indicative of a data access condition, a violation location, a violation organization, and/or the like. In some examples, the condition alert may be automatically routed to a data management team assigned to address the data access violation.

In some embodiments, the term "violation severity" refers to a data entity that describes an attribute of a data access condition. A violation severity may be indicative of one or more consequences (e.g., incarceration, fines, warnings, etc.) for a respective data access condition. In some examples, a violation severity may be based on a size of a graph cycle (e.g., a number of vertices, etc.), one or more data entities involved, one or more vertex descriptions, and/or the like.

In some embodiments, the term "ranked list of violation conditions" refers to a data entity that describes a plurality of data access conditions. A ranked list of violation conditions may be indicative of a summarized list of data access conditions. The ranked list of violation conditions, for example, may be indicative of one or more data entities, potential interactions, and/or the like that are associated with one or more data access conditions. In some examples, the ranked list of violation conditions may be indicative of a plurality of data access conditions and/or a violation severity associated with each data access condition. In some examples, the plurality of data access conditions may be ordered with respect to the violation severities.

IV. OVERVIEW

Embodiments of the present disclosure present data compliance monitoring and enforcement techniques that improve computer interpretation and utilization of complex data access constraints for access controlled datasets. To do so, the present disclosure provides data interpretation techniques and graph-based data structures for efficiently interpreting data interactions. The present disclosure provides the data interpretation techniques leverage natural language processing models, in combination with auxiliary machine learning models and recognized ontologies, to improve data access constraint extraction from natural language text. Moreover, the present disclosure provides a knowledge graph and process for generating the knowledge graph to efficiently monitor data access patterns relative to a plurality of interrelated, complex, data access constraints across multiple data segments of a robust access controlled dataset. In this way, some embodiment of the present disclosure provide improved data compliance techniques capable of monitoring, tracking, and enforcing historical and real time data interactions. These techniques improve upon conventional compliance techniques that are unable to efficiently handle complex data access constraints reliably enough for full automation or real time monitoring.

In some embodiment, the techniques of the present disclosure may collect relevant natural language texts for a data controlled dataset, including regulatory (e.g., data access and storage rules) and/or audit texts (e.g., data type (member, provider, claim), data access logs, enterprise org chart, geolocation information for user, and/or the like. The natural language texts are parsed using natural language processing techniques to generate data compliance rules that indicate which regulations apply to which types of data as well as what rules (location, role-based, etc.) apply to the data. These parsed relationships are leveraged to populate a knowledge graph using a recognized ontology of standardized terms. The knowledge graph may be leveraged, with cycle detection algorithms, to efficiently identify violation of a data access constraint. A detected cycle may be passed to an explainer system that uses the vertices and edges of the semantic knowledge system to translate the detected cycle into a natural language description of a violation. In this way, some of the techniques of the present disclosure may automatically extract and/or define data entities and usage rights across a plurality of natural language texts. In addition, some of the techniques of the present disclosure may use graph technology to store and visualize data usage rights, data lineage, and actual usage in real time. Moreover, some of the techniques of the present disclosure enable automated compliance, audit support, and risk scoring to conserve computing processing resources, while enabling real data compliance monitoring.

Example inventive and technologically advantageous embodiments of the present disclosure include: (i) knowledge graph data structures for holistically structuring data access constraints; (ii) techniques for leveraging the knowledge graph data structure to identify data access condition; (iii) simulation techniques for simulating augmented data access constraints to proactively detect and address data coverage violations; and/or (iv) predictive alerting and natural language notification techniques for addressing data access violation, among other advantages.

V. EXAMPLE SYSTEM OPERATIONS

As indicated, various embodiments of the present disclosure make important technical contributions to data compliance techniques. In particular, some of the systems and methods of the present disclosure implement data compliance monitoring and enforcement techniques for enabling real time and holistic monitoring of data interactions across a plurality of complex data access constraints that are individually defined by natural language texts. In this manner, some of the systems and methods of the present disclosure may improve upon traditional data compliance techniques by reliably automating a process traditionally too complex for automation.

Figure 3:
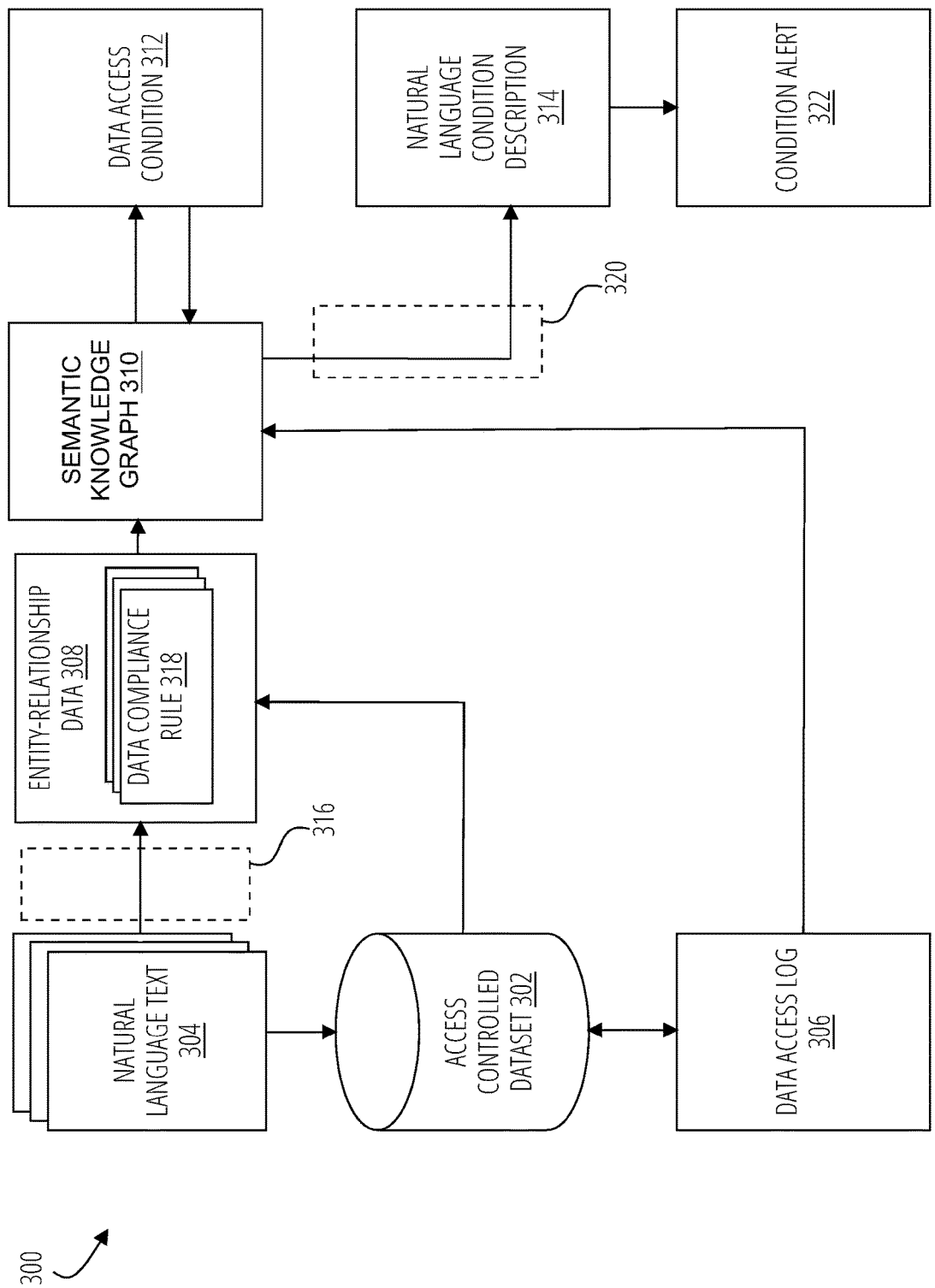
FIG. 3 is a dataflow diagram showing example data structures for detecting a data access condition in accordance with some embodiments discussed herein.

FIG. 3 is a dataflow diagram 300 showing example data structures for detecting a data access condition in accordance with some embodiments discussed herein. The dataflow diagram 300 depicts a set of data structures and modules for mapping, monitoring, and/or enforcing data access constraints for an access controlled dataset 302.

In some embodiments, the access controlled dataset 302 is a data entity that describes data subject to one or more data access constraints. The access controlled dataset 302, for example, may include a plurality of data segments, such as data tables, data objects, data catalogs, and/or the like, that may be accessed by one or more entities. The data segments of the access controlled dataset 302 may include information that may be subject to different data access constraints based on the sensitivity, confidentiality, and/or any other characteristic that may impact an availability of the data segment. For example, the access controlled dataset 302 may include data segments that are indicative of confidential information that is protected by one or more internal confidentiality policies that govern a user's access to the confidential information. As another example, access controlled dataset 302 may include data segments that are indicative of sensitive user information, such as PII, that is protected by one or more external privacy policies that govern a user's access to the sensitive user information. As described herein, an access controlled dataset 302 May include any number of data segments that each may be associated with any number of different data access constraints.

In some embodiments, a data access constraint is a constraint on access to one or more data segments of the access controlled dataset 302. A data access constraint may be indicative of one or more data obligations, usage rights, operations, and/or the like, for a data segment from the access controlled dataset 302. A data access constraint, for example, may be indicative of a restriction on the accessibility of a data segment by a particular person/organization, from a particular location, for a particular purpose, at a particular time, and/or the like. In some examples, a data access constraint may be defined by natural language text 304.

In some embodiments, the natural language text 304 is a data entity that describes one or more data access constraints for the access controlled dataset 302. The natural language text 304 may include a natural language document, phrase, record, and/or any other representation of natural language. The natural language text 304 may include a unit of natural language that defines one or more attributes of one or more data access constraints. For instance, the natural language text 304 may include one or more regulatory documents, policy manuals, technical specifications, organizational charts, and/or the like. In some examples, the natural language text 304 may define a data access constraint in natural language. In some examples, the natural language text 304 may define an attribute (e.g., a data entity, relationship between data entities, etc.) of a data access constraint.

In some embodiments, entity-relationship data 308 for the access controlled dataset 302 may be generated from the natural language text 304. For example, the entity-relationship data 308 may be generated using one or more natural language models 316. The entity-relationship data 308, for example, may be indicative of one or more data access constraints for a plurality of dataset entities associated with the access controlled dataset 302.

In some embodiments, the natural language model 316 is a data entity that describes parameters, hyper-parameters, and/or defined operations of a rules-based, statistical, and/or machine learning model (e.g., model including at least one of one or more rule-based layers, one or more layers that depend on trained parameters, coefficients, and/or the like). For instance, a natural language model 316 may include a language model that is trained to extract entity-relationship data 308 from natural language text 304. In some examples, the natural language model 316 may include a machine learning model including one or more supervised, unsupervised, semi-supervised, reinforcement learning models, and/or the like. In some examples, a natural language model 316 may include multiple models configured to perform one or more different stages of a natural language interpretation process. As one example, a natural language model 316 may include an NLP configured to extract entity-relationship data 308 from the natural language text 304. The NLP may include any type of natural language processor including, as examples, support vector machines, Bayesian networks, maximum entropies, conditional random fields, neural networks, and/or the like.

In some embodiments, the entity-relationship data 308 is a data entity that describes information extracted from natural language text 304. For example, entity-relationship data 308 may include one or more data compliance rules and/or one or more attributes for one or more data compliance rules. For instance, entity-relationship data 308 may be indicative of one or more data entities, potential interactions, and/or metadata thereof (e.g., a number of occurrences of the data entities, etc.) from the natural language text 304.

In some embodiments, generating the entity-relationship data 308 include generating a plurality of data compliance rules 318 from a plurality of natural language texts 304 corresponding to the access controlled dataset 302. A data compliance rule 318 may be indicative of one or more dataset entities and/or one or more potential interactions between the one or more dataset entities. In some examples, the data compliance rule 318 is a structured language rule that includes a plurality of nouns, a plurality of verbs, and/or a plurality of adjectives. In some examples, the plurality of nouns may correspond to the one or more dataset entities. In addition, or alternatively, the plurality of verbs and/or the plurality of adjectives may correspond to the one or more potential interactions.

In some embodiments, the data compliance rule 318 is a data entity that describes a structured language representation of a data access constraint. For example, a data compliance rule 318 may include a structured language rule extracted from the natural language text 304. The data compliance rule 318 may include a plurality of nouns, a plurality of verbs, and/or a plurality of adjectives. Each of the nouns, verbs, and/or adjectives may be extracted from natural language text 304 and/or transformed from one or more counterpart nouns, verbs, and/or adjectives extracted from natural language text 304. In some examples, the plurality of nouns may correspond to one or more dataset entities. In some examples, the plurality of verbs and/or adjectives may correspond to one or more potential interactions between the dataset entities.

In some embodiments, a dataset entity is a data entity that describes an object associated with the access controlled dataset 302. For example, a dataset entity may be a data access constraint, a data segment, and/or one or more recognized nouns from a natural language text 304. For example, a plurality of dataset entities may be generated from a corpus of natural language text 304, a recognized ontology, and/or any other information that is related to one or more locations, data sources, programs, and/or the like associated with the access controlled dataset 302. In some examples, a dataset entity may include one or more hierarchical entities that are indicative of one or more nested entity relationships. A hierarchical entity, for example, may include a hierarchical organization, a hierarchical geographic location, and/or the like. A hierarchical organization, for instance, may include a plurality of organization entities in which first organization entity has a parent and/or child relationship with a second organization entity. A hierarchical geographic location may include a plurality of location entities in which first location entity has a parent and/or child relationship with a second location entity (e.g., a state location entity is located within a country location entity and is therefore child of the country location entity). As described herein, hierarchical entities may be efficiently accounted for within a graph data structure, such as a knowledge graph, through self referencing nodes, and/or the like.

In some embodiments, a potential interaction is a data entity that describes a relationship between one or more data entities of a dataset, such as the access controlled dataset 302. For example, a potential interaction may be indicative of a relationship between two data entities extracted from the natural language text 304. A potential interaction, for example, may be indicative of an action (e.g., accessing, modifying, etc.) performed by one data entity with another data entity. In some examples, a potential interaction may be extracted from natural language text 304 (and/or a data compliance rule 318) by leveraging part of speech tagging (POS tagging). For instance, POS tagging may be leveraged to extract verbs from the natural language text 304 (and/or the data compliance rule 318).

In some embodiments, a potential interaction is linked to one or more dataset entities and/or a data compliance rule 318. For instance, a potential interaction may link extracted dataset entities with POS tagged with "regulation associated" verbs and adjectives (applies, infer, manage, control, protect, limit, approve, review, enable, prevent, restrict). The list of regulation associated verbs and adjectives may be constantly updated with manual review.

In some embodiments, one or more of the data compliance rules 318 are associated with metadata. The metadata may include one or more attributes, such as a time stamp. In some embodiments, a time stamp is an attribute of a data compliance rule 318. A time stamp may be indicative of an effective time range for a data compliance rule 318. For example, the time stamp may be indicative of an effective start date, an effective end date, an effective modification date, and/or the like for a data compliance rule 318.

In some embodiments, the plurality of nouns of a data compliance rule 318 includes one or more recognized nouns from a recognized ontology. The plurality of data compliance rules 318 may be generated by extracting a noun from the plurality of natural language texts 304, generating, using a term linking model, a recognized noun based on a comparison between the noun and a recognized ontology, and assigning, using a classification model, an entity category to the recognized noun.

In some embodiments, a recognized noun is a data entity that describes a term from a recognized ontology. For example, a recognized noun may be associated with a recognized ontology. The recognized noun may be a term of a recognized ontology. In some examples, a recognized noun may be associated with a data entry from a recognized ontology that describes metadata, such as one or more attributes, synonyms, descriptions, and/or the like for the recognized noun.

In some embodiments, a recognized ontology is a data entity that describes a standardized ontology of recognized nouns for a dataset. A recognized ontology, for example, may include a corpus of terms (e.g., nouns, etc.) and/or metadata for each of the terms. A corpus of terms may be aggregated from one or more data sources of a prediction domain to generate a holistic recognized ontology of terms for a prediction domain. For example, in a clinical prediction domain, a recognized ontology may include a corpus of terms associated with Medicaid data that may be derived from medical government data sources and/or healthcare provider data sources, and/or the like. In some examples, the recognized ontology may be modified based on one or more unrecognized nouns extracted from the natural language text 304.

In some embodiments, a term linking model is a data entity that describes parameters, hyper-parameters, and/or defined operations of a rules-based, statistical, and/or machine learning model (e.g., model including at least one of one or more rule-based layers, one or more layers that depend on trained parameters, coefficients, and/or the like). For instance, a term linking model may include a machine learning model that is trained to link one or more synonyms from the natural language text 304 to a term of a recognized ontology. In some examples, a term linking model may include a machine learning model including one or more supervised, unsupervised, semi-supervised, reinforcement learning models, and/or the like. In some examples, a term linking model may include multiple models configured to perform one or more different stages of a term linking process.

In some embodiments, the term linking model includes a machine learning model that is trained to map nouns from the natural language text 304 to a term (e.g., a recognized noun) of a recognized ontology. By way of example, in a clinical prediction domain, the term linking model may be configured to link nouns extracted from clinical solution data to a recognized ontology for Medicaid data. For example, the term linking model may include a statistical shape analysis algorithm, such as the Procrustes algorithm, that is configured to generate a mapping between term embeddings (e.g., Word2Vec embeddings, BERT embeddings, USE, etc.). The term embeddings, for example, may include a vector embeddings generated for each term of a recognized ontology and each noun extracted from a natural language text 304. The term linking model may be trained to learn a mapping between the two embedding spaces using an alignment matrix W. W may be approximately obtained by solving with singular value decomposition. For instance, the alignment matrix W may be denoted as:

$$W^* = \underset{W \in \mathbb{R}^{d \times d}}{\mathrm{argmin}} \|WX - Y\|^2$$

In some examples, a KNN model may be applied to link terms from the recognized ontology to nouns extracted from the natural language text 304. In some examples, term linking may be limited to a subset of nouns from the natural language text 304. For instance, a keyword extraction model, such as YAKE, may be used to identify a subset of relevant nouns (e.g., most relevant 1000 nouns) from the natural language text 304 for linking by the term linking model.

In some embodiments, an entity category is a data entity that describes a label for a data entity. For example, an entity category may include one or more defined categories of recognized nouns from a recognized ontology. The entity categories, for example, may include an organization category, a person category, a regulation category, a location category, and/or the like. In some examples, an entity category may be assigned as a token to each term of a recognized ontology and/or data entity from data compliance rules 318.

In some embodiments, a classification model is a data entity that describes parameters, hyper-parameters, and/or defined operations of a rules-based, statistical, and/or machine learning model (e.g., model including at least one of one or more rule-based layers, one or more layers that depend on trained parameters, coefficients, and/or the like). For instance, a classification model may include a machine learning model that is trained to generate an entity category for a data entity. In some examples, a classification model may include a machine learning model including one or more supervised, unsupervised, semi-supervised, reinforcement learning models, and/or the like. In some examples, a classification model may include multiple models configured to perform one or more different stages of a term linking process. In some embodiments, the classification model may include a deep neural network, such as a DNN Seq2Seq model, trained, using one or more supervised training techniques, to generate an entity category for a dataset entity.

In some embodiments, a knowledge graph 310 may be generated based on the entity-relationship data 308. The knowledge graph 310, for example, may include a plurality of vertices connected by a plurality of edges. A vertex of the plurality of vertices is indicative of a dataset entity of the plurality of dataset entities and/or an edge of the plurality of edges may be indicative of a potential interaction between two dataset entities of the plurality of dataset entities.

In some embodiments, the knowledge graph 310 is a data structure that defines a plurality of data entities and potential interactions for the access controlled dataset 302. For example, a knowledge graph 310 may include a graph schema that defines a plurality of nodes and edges indicative of the plurality of data entities and/or potential interactions between the plurality of data entities. For instance, the knowledge graph 310 may include a plurality of vertices connected by a plurality of edges. Each vertex of the plurality of vertices may be indicative of a dataset entity of the plurality of dataset entities. Each edge of the plurality of edges may be indicative of a potential interaction between two dataset entities of the plurality of dataset entities. Each vertex may be represented by a node of the graph schema and each edge may be represented by a link between two nodes. In some examples, a knowledge graph 310 may include a vertex for each dataset entity associated with the access controlled dataset 302 and an edge for each potential interaction defined by a plurality of data compliance rules 318 extracted from natural language text 304 associated with the access controlled dataset 302. The knowledge graph may include any type of graph data structure including a knowledge graph, a labeled property graph, and/or the like.

In some embodiments, a knowledge graph 310 includes a plurality of versions. For example, a graph version may include an attribute of a knowledge graph 310. For instance, the graph version may be indicative of a time version for the knowledge graph 310. The knowledge graph 310 may include a plurality of vertices and/or edges that define a plurality of data entities and/or potential interactions that are in effect within a particular time range defined by the time version. For instance, the plurality of vertices and edges may be based on one or more time stamps associated with a plurality of data compliance rules 318 extracted from a plurality of natural language texts 304.

In some embodiments, a data access condition 312 may be identified using the knowledge graph 310. The data access condition 312, for example, may be indicative of a data access violation and/or a data coverage violation.

In some embodiments, the data access condition 312 is a data entity that describes an insight associated with data access patterns for the access controlled dataset 302. For example, a data access condition 312 may include a data access violation, a data coverage violation, and/or any other condition, violation, and/or the like, that is associated with one or more data access constraints (e.g., potential, historical, and/or current), the access controlled dataset 302, and/or one or more data access patterns thereof.

In some embodiments, a data access violation is a data entity that describes a type of data access condition. A data access violation may be indicative of a violation of a data access constraint based on one or more access patterns of a user, and/or the like. In some embodiments, a data coverage violation is a data entity that describes a type of data access condition. A data coverage violation may be indicative of a potential violation of one or more existing data access constraints based on a new, modified, deleted data access constraint, and/or the like.

In some embodiments, a data access condition is based on one or more data access logs 306. For example, one or more data access logs 306 may be received for the access controlled dataset 302. The data access logs 306 may be indicative of one or more data access interactions associated with the access controlled dataset 302. The data access logs 306 may be received on-demand, on a predetermined frequency, in response to a triggering event, and/or continuously in real time.

In some embodiments, the data access logs 306 are data entities that describe one or more access patterns for the access controlled dataset 302. A data access log 306 may describe a plurality of historical and/or real-time data interactions. In some examples, the data access log may describe a plurality of data interactions and/or attributes associated with the plurality of data interactions. The attributes, for example, may be indicative of a timing of the data interactions.

In some embodiments, the data interaction is a data entity that describes a particular data access event from a data access log 306. A data interaction may be associated with a time stamp. The time stamp may be a current time stamp, a historical time stamp, and/or a predicted time stamp. For example, the data interaction may include a historical data interaction associated with a historical time stamp. In some examples, the data interaction may include a historical data interaction. A historical data interaction may include a data interaction that is previously performed at a historical time period. In some examples, a historical data interaction may be associated with a historical time stamp that is indicative of a historical time corresponding to the performance of the data interaction. In some examples, the data interaction may include a real-time data interaction. A real-time data interaction may include a data interaction that is performed within a current time period. For example, the real-time data interaction may include a data interaction that is recorded (e.g., within a data access log) in real and/or near real time. The real-time data interaction may be associated with a current time stamp. As another example, the data interaction may include a predicted data interaction. The predicted data interaction may include a data interaction that may be performed after a current time period (e.g., based on one or more historical access patterns, etc.). The predicted data interaction may be associated with a predictive time stamp.

In some embodiments, a data access condition 312 corresponds to a data interaction. In some examples, in the event the data interaction is a historical data interaction, the data access condition 312 may be identified based on a historical graph version of the knowledge graph 310 that corresponds to the historical time stamp of the historical data interaction.

In some embodiments, a data access condition 312, such as a data access violation, is identified based on a graph cycle from the knowledge graph 310. For example, one or more correlative vertices may be identified from the plurality of vertices based on the one or more data access logs 306. Using the knowledge graph 310, a graph cycle may be identified based on the one or more correlative edges between the one or more correlative vertices. In some examples, a data access condition 312 (e.g., a data access violation) may be identified in response to identifying the graph cycle.

In some embodiments, a correlative vertex is a data entity that describes a vertex corresponding to a data interaction. A correlative vertex, for example, may include a vertex corresponding to a data entity associated with a data interaction. In some embodiments, a correlative edge is a data entity that describes an edge corresponding to a data interaction. A correlative edge, for example, may include an edge corresponding to a potential interaction associated with a data interaction.

In some embodiments, a graph cycle is a data entity that describes a vertex and/or edge pattern within the knowledge graph 310 (and/or historical version thereof). A graph cycle may be indicative of a sequence of vertices and/or edges that form a continuous cycle. A graph cycle may be detected by traversing a knowledge graph 310 using one or more correlative vertices and/or correlative edges from a data interaction. As described herein, a data access condition 312 may be generated for a data interaction in the event that a graph cycle is detected.

In some embodiments, a data access condition 312, such as a data coverage violation, is identified based on a constraint augmentation for a data access constraint. A constraint augmentation, for example, may be indicative of a new data access constraint, a modification to an existing data access constraint, and/or a removal of an existing data access constraint. For example, an augmented knowledge graph may be generated by modifying the knowledge graph 310 based on the constraint augmentation. The data access condition 312 (e.g., data coverage violation) may be identified based on the augmented knowledge graph. For example, the data access logs 306 may be received. One or more correlative vertices may be identified from the augmented knowledge graph based on one or more data interactions from the data access logs 306. The data access condition 312 (e.g., data coverage violation) may be identified in response to a graph cycle corresponding to the one or more correlative vertices.

In some embodiments, the augmented knowledge graph is a simulated variation of a knowledge graph 310. For example, the augmented knowledge graph may include a knowledge graph 310 that is augmented to simulate a constraint augmentation. In some examples, an augmented knowledge graph may be generated and then traversed to detect potential conflicts among a plurality of data access constraints and/or one or more constraint augmentations. A potential conflict may be represented by a data coverage violation.

In some embodiments, a constraint augmentation is a constraint on the availability of one or more data segments of the access controlled dataset 302. A constraint augmentation may be indicative of a new data access constraint, a modification to an existing data access constraint, and/or a removal of an existing data access constraint. A constraint augmentation may include a simulated change to one or more existing data access constraints for the access controlled dataset 302.

In some embodiments, a natural language condition description 314 may be generated based on the data access condition 312. The natural language condition description 314 may be generated using the knowledge graph 310. For example, the natural language condition description 314 may be generated based on one or more correlative vertices of the knowledge graph 310. In some examples, the one or more vertex descriptions may be received that correspond to the one or more correlative vertices. In some examples, the natural language condition description may be generated, using a generative model 320, based on the one or more vertex descriptions.

In some embodiments, the natural language condition description 314 is a natural language text description that describes a data access condition 312. A natural language condition description 314 may include a representation of a data access condition 312 in plain language. In some examples, a natural language condition description 314 may be generated by translating description logic to natural language. For example, the natural language condition description 314 may be generated based on one or more correlative vertices and/or correlative edges associated with a data access condition 312. In some examples, the natural language condition description 314 may be based on one or more vertex descriptions corresponding to the one or more correlative vertices.

In some embodiments, a vertex description is an attribute of a vertex from the knowledge graph 310. A vertex description, for example, may include a textual description of a data entity corresponding to a vertex of the knowledge graph 310.

In some embodiments, the generative model 320 is a data entity that describes parameters, hyper-parameters, and/or defined operations of a rules-based, statistical, and/or machine learning model (e.g., model including at least one of one or more rule-based layers, one or more layers that depend on trained parameters, coefficients, and/or the like). For instance, a generative model 320 may include a machine learning model that is trained to generate a natural language condition description 314 for a data access condition 312. In some examples, the generative model 320 may include a machine learning model including one or more supervised, unsupervised, semi-supervised, reinforcement learning models, and/or the like. In some examples, the generative model 320 may include multiple models configured to perform one or more different stages of a generative language process.

In some embodiments, the generative model 320 includes an explainable model, such as an ACE model. By way of example, the generative model 320 may include an OWL verbalizer that is configured to generate a natural language condition description 314 for a data interaction based on a recognized ontology, one or more correlative vertices and/or edges, and/or one or more descriptions thereof. In addition, or alternatively, the generative model 320 may include an LLM that may be configured to enhance ACE through in-context learning and/or prompt engineering.

In some embodiments, a condition alert 322 indicative of the natural language condition description 314 is provided. In some embodiments, the condition alert 322 is a data entity that describes a data access condition 312. A condition alert 322 may include a computing output, such as one or more control instructions, a user interface message, and/or the like, that is indicative of the data access condition 312 (e.g., the natural language condition description 314, etc.). In some examples, the condition alert may include a work order. For instance, a condition alert may include an automatically generated, natural language work order indicative of a data access condition, a violation location, a violation organization, and/or the like.

For example, the condition alert 322 may be automatically provided to an entity (e.g., user, organization, data owner, etc.) associated with a data interaction that triggers a data access condition. For instance, the condition alert 322 may be automatically provided to a user that triggers a data access condition by initiating a restricted data interaction. In addition, or alternatively, the condition alert 322 may be automatically provided to a data owner associated with a data segment accessed through the restricted data interaction. In some examples, the condition alert 322 may be provided in real time. For instance, in the event that the data interaction is a real-time data interaction that corresponds to a user (e.g., a data owner, a user triggering the data access condition, etc.), a user device (and/or a user account, profile, interface, etc.) for the user may be identified and the condition alert may be provided to the user device (and/or a user account, profile, interface, etc.) in real time.

In addition, or alternatively, the condition alert 322 may be automatically routed to a data management team assigned to address the data access violation. For example, a data access condition 312, such as a data access violation, may be associated with one or more violation locations, organizations, and/or the like that may be addressed by different data management teams. As an example, a data access violation may be indicative of a data access breach in which a user from India accesses data restricted to United States users. In such a case, a US data management team may be assigned to address the data access violation by automatically generating and providing a work order to the data management team. By way of example, one or more violation locations associated with the data access violation may be identified. In some examples, one or more violation organizations associated with data access violation may be identified. The condition alert may be generated based on the one or more violation locations and/or the one or more violation organizations. The data management team may be identified for the data access violation based on the one or more violation locations and/or the violation organizations and the condition alert may be provided to the data management team.

In some embodiments, a data access condition 312, such as a data access violation, is associated with a violation severity. In some examples, the violation severity may be identified for the data access condition 312 (e.g., data access violation). In some embodiments, a violation severity is a data entity that describes an attribute of a data access condition 312. A violation severity may be indicative of one or more consequences (e.g., incarceration, fines, warnings, etc.) for a respective data access condition 312. In some examples, a violation severity may be based on a size of a graph cycle (e.g., a number of vertices, etc.), one or more data entities involved, one or more vertex descriptions, and/or the like.

In some embodiments, a ranked list of violation conditions may be generated based on the violation severity. In some examples, the condition alert 322 may be based on the ranked list of violation conditions.

In some embodiments, a ranked list of violation conditions is a data entity that describes a plurality of data access conditions 312. A ranked list of violation conditions may be indicative of a summarized list of data access conditions 312. The ranked list of violation conditions, for example, may be indicative of one or more data entities, potential interactions, and/or the like that are associated with one or more data access conditions. In some examples, the ranked list of violation conditions may be indicative of a plurality of data access conditions and/or a violation severity associated with each data access condition. In some examples, the plurality of data access conditions may be ordered with respect to the violation severities.

In this manner, data compliance rules 318 may be extracted and leveraged to generate data compliance insights that may be used to improve data compliance monitoring and enforcement for access controlled datasets 302. Operational examples of a data compliance rule 318 will now further be described with reference to FIGS. 4A-B.

FIG. 4A is an operational example 400 of a data compliance rule in accordance with some embodiments discussed herein. The operational example 400 illustrates one example data compliance rule 402 that may be extracted from a natural language text. In some examples, the data compliance rule may include a title, headings, and/or content under each heading that may be accessible through a key. Each title may represent one data access constraint in a natural language text with multiple conditions under each data access constraint. The data compliance rule 402 may represent the natural language text in a JSON-like format in which a title contains the data access constraint name and the headings/sub-headings/content contain more information about the title.

In some examples, data compliance rule 402 may include one or more labels. For example, one or more related natural language texts may be labeled using their metadata and/or their corresponding categories (e.g., manually annotated categories, etc.). The labeled natural language text may be vectorized using one or more vectorization techniques, such a Word2Vec, and/or the like, based on a recognized ontology. In some examples, the natural language text may be represented as a multidimensional array of floating-point numbers and each label may be represented as one-hot-encoding vector of ones and zeros. In the event that a word does not have a corresponding category, it may be labeled as "UNK". Otherwise, the word may be labeled with an entity category.

In some examples, a classification model (e.g., a sequential deep learning model) may be trained to generate the entity categories using the vectorized documents (inputs) and their corresponding one-hot-encoded labels (targets). The training techniques may include sequential modeling techniques, such as fine-tuning BERT model and/or LSTM/RNN training techniques. In some examples, the classification model learns to "predict existing and new keywords" in an utterance and assign them to their corresponding categories. For example, the entity categories may be predicted by withholding a test/training set from a training dataset with labeled entities and using the classification model to mask the labeled entities and predict.

FIG. 4A is an operational example 450 of a data compliance rule in accordance with some embodiments discussed herein. The data compliance rule 404 may include multiple headings and sub-headings each with their own associated contents to represent multiple data access constraints.

As described herein and illustrated by the data compliance rules 402 and 404, data access constraints may be complex and impact a plurality of interrelated data entities. These technical problems have traditionally prevented the development of automated data compliance monitoring and enforcement techniques that may be performed in real time. As described herein, some embodiments of the present disclosure represent the data compliance rules, such as data compliance rule 402 and data compliance rule 404, using a universal knowledge graph that holistically combines a plurality of interrelated, complex, data compliance rules into one traversable data structure. In this manner, a knowledge graph may be leveraged to generate data compliance insights that may be used to improve data compliance monitoring and enforcement for large access controlled datasets. As described herein, the graph schema of the knowledge graph enables real time generation of compliance insights that are not achieved by traditional techniques. An operational example of a knowledge graph will now further be described with reference to FIG. 5.

Figure 5:
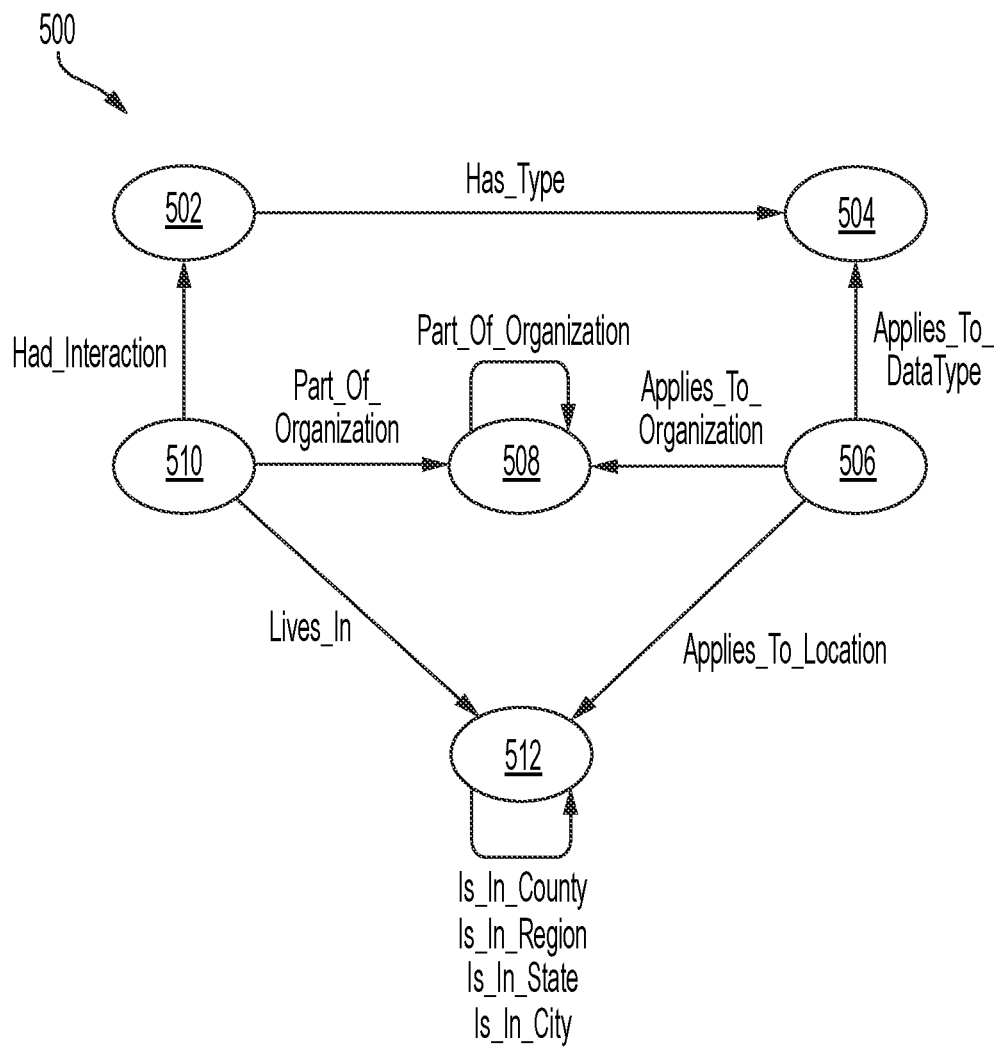
FIG. 5 is an operational example of a knowledge graph in accordance with some embodiments discussed herein.

FIG. 5 is an operational example of a knowledge graph 500 in accordance with some embodiments discussed herein. The knowledge graph 500 may include a plurality of nodes and links between the nodes as described herein. The nodes may include a plurality of vertices representative of a plurality of dataset entities associated with an access controlled dataset. By way of example, the knowledge graph 500 may include a first vertex indicative of data segment 502, a second vertex indicative of a data type 504, a third vertex indicative of a data compliance rule 506, a fourth vertex indicative of a hierarchical organization 508, a fifth vertex indicative of user 510, a sixth vertex indicative of a hierarchical location 512, and/or the like. Each of the vertices may be linked by one or more edges that are indicative of a relationship between the data entities respectively represented by the vertices. By way of example, the first and second vertices may be linked by an edge indicating that the data segment 502 has a type that is defined by the data type 504. The second and third vertices may be linked by an edge indicating that a data compliance rule 506 applies to the data type 504. The third and fourth vertices may be linked by an edge indicating that the data compliance rule 506 applies to the hierarchical organization 508. The third and sixth vertices may be linked by an edge indicating that the data compliance rule 506 applies to the hierarchical location 512. The sixth and fifth vertices may be linked by an edge indicating that the user 510 lives in the hierarchical location 512. The fourth and fifth vertices may be linked by an edge indicating that the user 510 is part of the hierarchical organization 508. The fifth and first vertices may be linked by an edge indicating that a user 510 may potentially interact with the data segment 502.

In some examples, each vertex may include one or more self-referential edges indicative of one or more hierarchical relationships. For example, the fourth vertex may include a self-referential edge indicating that the hierarchical organization 508 is a part of another organization. As an example, the sixth vertex may include one or more self-referential edges indicating that the hierarchical location 512 is in a country, a region, a state, a city, and/or the like.

In this manner, a plurality of complex entity relationships may be represented using a single graph-based data structure. By doing so, the knowledge graph 500 may be traversed in real time to detect data access conditions based on a sequence of vertices traversed for a particular data interaction. The data access condition, for example, may be identified based on a form that the data interaction presents within the knowledge graph 500, such as a graph cycle. Operational examples of graph cycles will now further be described with reference to FIGS. 6A-B.

Figure 6A:
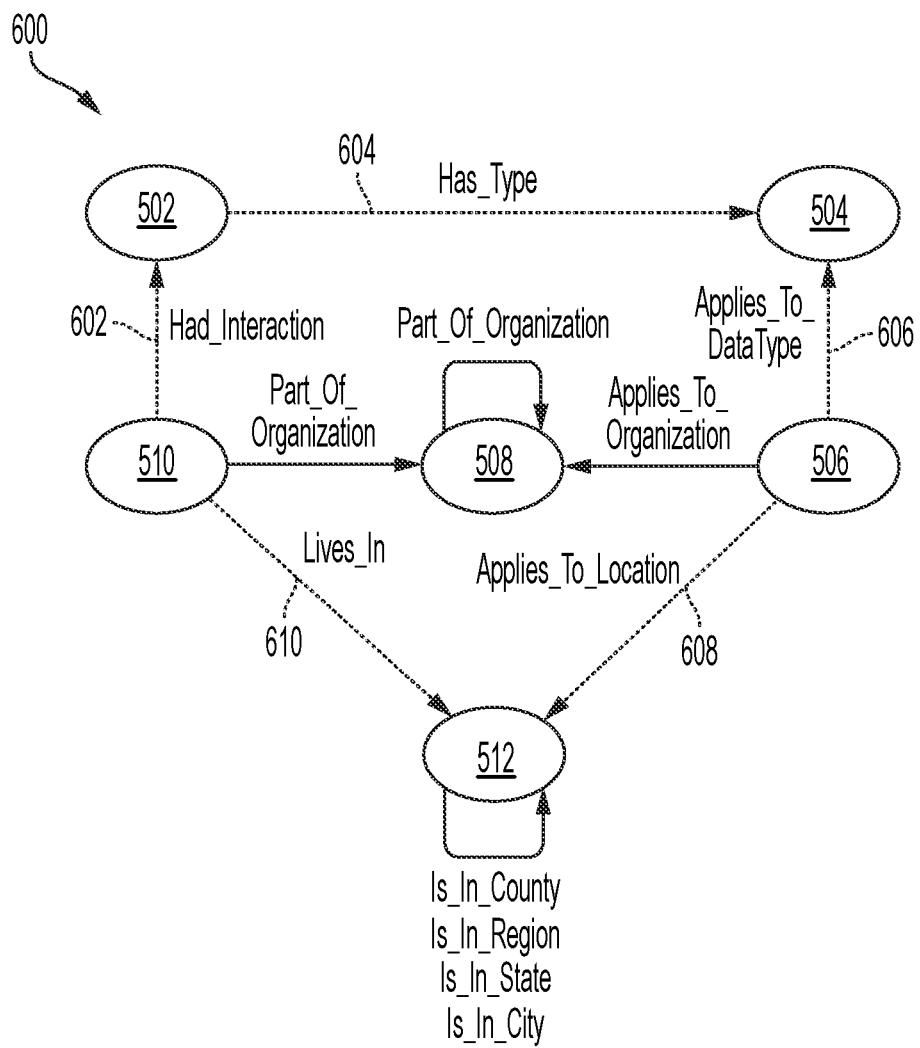
FIG. 6A is an operational example of a graph cycle within a knowledge graph in accordance with some embodiments discussed herein.
Figure 6B:
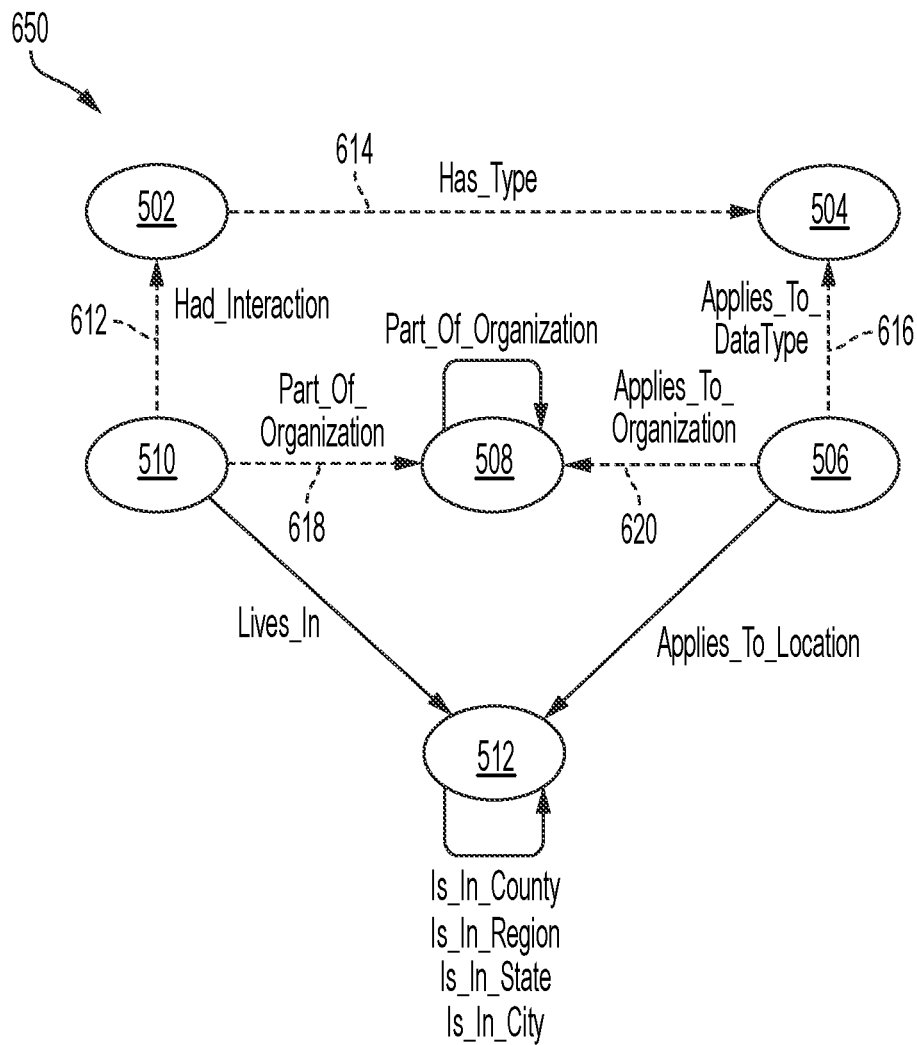

FIG. 6A is an operational example of a graph cycle 600 within the knowledge graph 500 in accordance with some embodiments discussed herein. As illustrated, a graph cycle 600 may include a plurality of vertices that form a continuous cycle. By way of example, the graph cycle 600 may include a first correlative edge 602 indicating that the user 510 interacted with the data segment 502 and a fifth correlative edge 610 indicating that the user 510 lives in the hierarchical location 512. The graph cycle 600 may include a second correlative edge 604 indicating that the data segment 502 includes a data type 504. And, the graph cycle 600 may include a third correlative edge 606 and a fourth correlative edge 608 indicating that the data compliance rule 506 restricts access to the data type 504 from the hierarchical location 512. Thus, the graph cycle 600 represented by the correlative edges 602, 604, 606, 608, and 610 may indicate that a user 510 accessed the data segment 502 from a hierarchical location 512 restricted by the data compliance rule 506.

FIG. 6A is an operational example of a graph cycle 650 within the knowledge graph 500 in accordance with some embodiments discussed herein. As illustrated, the graph cycle 650 may include a plurality of vertices that form a continuous cycle. By way of example, the graph cycle 650 may include a first correlative edge 612 indicating that the user 510 interacted with the data segment 502 and a fourth correlative edge 618 indicating that the user 510 is part of the hierarchical organization 508. The graph cycle 600 may include a second correlative edge 614 indicating that the data segment 502 includes a data type 504. And, the graph cycle 600 may include a third correlative edge 616 and a fifth correlative edge 620 indicating that the data compliance rule 506 restricts access to the data type 504 from the hierarchical organization 508. Thus, the graph cycle 650 represented by the correlative edges 612, 614, 616, 618, and 620 may indicate that a user 510 accessed the data segment 502 from a hierarchical organization 508 restricted by the data compliance rule 506.

Figure 7:
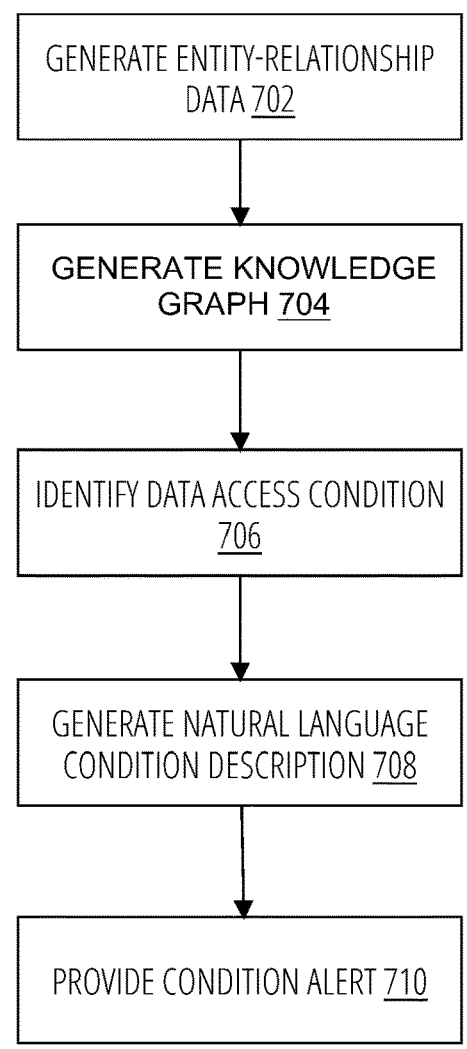
FIG. 7 is a flowchart showing an example of a process for identifying a data access condition in accordance with some embodiments discussed herein.

FIG. 7 is a flowchart showing an example of a process 700 for identifying a data access condition in accordance with some embodiments discussed herein. The flowchart depicts a compliance monitoring and enforcement technique that overcomes various limitations associated with traditional data compliance techniques. The compliance monitoring and enforcement techniques may be implemented by one or more computing devices, entities, and/or systems described herein. For example, via the various steps/operations of the process 700, the computing system 100 may leverage natural language text and/or a knowledge graph to identify data access conditions to overcome the various limitations with conventional compliance techniques that are unable to automatically and accurately detect data access conditions in real time.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 includes, at step/operation 702, generating entity-relationship data. For example, the computing system 100 may generate the entity-relationship data from a natural language text. For instance, the computing system 100 may generate, using one or more natural language models, the entity-relationship data for an access controlled dataset. The entity-relationship data may be indicative of one or more data access constraints for a plurality of dataset entities associated with the access controlled dataset.

In some embodiments, the computing system 100 generates, using the one or more natural language models, a plurality of data compliance rules from a plurality of natural language texts corresponding to the access controlled dataset. Each data compliance rule may be indicative of (i) one or more dataset entities and/or (ii) one or more potential interactions between the one or more dataset entities. In some examples, a dataset entity may be indicative of a natural language text, a hierarchical organization, a user, and/or a hierarchical geographic location, and the edge is indicative of at least a portion of a data access constraint defined by the natural language text. A data compliance rule may include a structured language rule including a plurality of nouns, a plurality of verbs, and a plurality of adjectives. The plurality of nouns may correspond to the one or more dataset entities. The plurality of verbs and/or the plurality of adjectives may correspond to the one or more potential interactions.

In some examples, the plurality of nouns may include one or more recognized nouns. The computing system 100 may extract a noun from the plurality of natural language texts and generate, using a term linking model, a recognized noun based on a comparison between the noun and a recognized ontology. In some examples, the computing system 100 may assign, using a classification model, an entity category to the recognized noun.

In some embodiments, the process 700 includes, at step/operation 704, generating a knowledge graph. For example, the computing system 100 may generate the knowledge graph based on the entity-relationship data. For instance, the computing system may generate a knowledge graph based on the entity-relationship data. The knowledge graph may include a plurality of vertices connected by a plurality of edges. In some examples, a vertex of the plurality of vertices may be indicative of a dataset entity of the plurality of dataset entities and an edge of the plurality of edges may be indicative of a potential interaction between two dataset entities of the plurality of dataset entities.

In some embodiments, the process 700 includes, at step/operation 706, identifying a data access condition. For example, the computing system 100 may identify the data access condition using the knowledge graph. For instance, the computing system 100 may identify, using the knowledge graph, a data access condition indicative of a data access violation and/or a data coverage violation.

The data access condition may be based on a data interaction. In some examples, the data interaction is a real-time data interaction that corresponds to a user. In some examples, the data interaction may be a historical data interaction that corresponds to a historical time stamp. In some examples, the data interaction may be a predicted data interaction that corresponds to a predictive time stamp. In some examples, the data access condition may be identified based on a graph version (e.g., current graph version, historical graph version, predicted graph version, etc.) of the knowledge graph that corresponds to the time stamp (e.g., current time stamp, historical time stamp, predicted time stamp, etc.). For example, the data interaction may correspond to a time stamp and the data access condition may be identified based on a graph version of the knowledge graph that corresponds to the time stamp.

In some examples, the time stamps may enable the generation of a violation timeline for a data access condition. A violation timeline, for example, may be indicative of graph object (e.g., a plurality of time stamped vertices, edges, etc.) that describes one or more historical, current, and/or predicted data access violations corresponding to a data access condition. The violation timeline may enable backtracking through a timeline of data access violations to target a root cause of the violation. In some examples, the violation timeline may include a plurality of potential violations. For example, the violation timeline may include a list of historical violations (e.g., potential list of violations that are not detected, etc.) a list of predicted violations, (e.g., potential list of violations that are predicted to happen in the future, etc.). The violation timeline may be generated for the data access violation by identifying a plurality of historical data access conditions and a plurality of predictive data access conditions corresponding to a data access violation. The plurality of historical data access conditions, for example, may be identified based on a comparison between a graph cycle, one or more data access logs, a plurality of graph versions of the knowledge graph, and/or the like.

In this manner, the process 700 may provide one or more technical improvements over traditional compliance monitoring techniques. For instance, by capturing temporal insight in a graph data structure, some of the techniques of the present disclosure may enable time aware compliance monitoring that allows for seamless compliance monitoring over time across a plurality of different data access constraints as constraints are added, modified, and/or removed from an access controlled dataset. In this way, the graph-based compliance monitoring techniques may adapt through time to various data access changes across a robust dataset, thereby increasing the accuracy, reliably, and efficiency of data compliance monitoring relative to traditional techniques.

In some embodiments, the process 700 includes, at step/operation 708, generating a natural language condition description. For example, the computing system 100 may generate the natural language condition description for the data access condition using the knowledge graph. For instance, the computing system 100 may generate, using the knowledge graph, a natural language condition description based on the data access condition. In some examples, the computing system 100 may receive one or more vertex descriptions corresponding to one or more correlative vertices corresponding to the data access condition. In some examples, the computing system 100 may generate, using a generative model, the natural language condition description based on the one or more vertex descriptions.

In some embodiments, the computing system 100 identifies a violation severity associated with the data access violation. The computing system 100 may generate a ranked list of violation conditions based on the violation severity.

In some embodiments, the process 700 includes, at step/operation 710, providing a condition alert. For example, the computing system 100 may provide the condition alert based on the data access condition and the natural language condition description. For instance, the computing system 100 may provide a condition alert indicative of the natural language condition description. In some examples, the condition alert may be based on the ranked list of violation conditions. In some examples, the condition alert may be based on a violation timeline.

In some examples, the computing system 100 may identify a user device for a user corresponding to a data access condition. The computing system 100 may provide the condition alert to the user device.

In this manner, the process 700 may provide one or more technical improvements over traditional compliance monitoring techniques by automating traditionally complex data monitoring and enforcement techniques. For instance, by capturing all data constraints in a single graph data structure, some of the techniques of the present disclosure may enable the efficient, accurate, and reliable detection of data access conditions based on the traversal of the graph data structure. This, in turn, allows for the automation and real time monitoring of data access patterns for robust access controlled datasets.

Some techniques of the present disclosure enable the generation of action outputs that may be performed to initiate one or more predictive actions to achieve real-world effects. The data compliance techniques of the present disclosure may be used, applied, and/or otherwise leveraged to identify data access conditions and/or generate natural language descriptions, condition alerts, and/or the like. These outputs may be leveraged to initiate the performance of various computing tasks that improve the performance of a computing system (e.g., a computer itself, etc.) with respect to various predictive actions performed by the computing system 100.

In some examples, the computing tasks may include predictive actions that may be based on a prediction domain. A prediction domain may include any environment in which computing systems may be applied to achieve real-word insights, such as predictions (e.g., data access condition, etc.), and initiate the performance of computing tasks, such as predictive actions (e.g., condition alerts, etc.), to act on the real-world insights. These predictive actions may cause real-world changes, for example, by controlling a hardware component, providing condition alerts, and/or the like.

Examples of prediction domains may include financial systems, clinical systems, autonomous systems, robotic systems, and/or the like. Predictive actions in such domains may include the initiation of automated instructions across and between devices, automated notifications, automated scheduling operations, automated precautionary actions, automated security actions, automated data processing actions, automated data compliance actions, automated data access enforcement actions, automated adjustments to computing and/or human data access management, and/or the like.

In some embodiments, the data compliance techniques of process 700 are applied to initiate the performance of one or more predictive actions. A predictive action may depend on the prediction domain. In some examples, the computing system 100 may leverage the data compliance techniques to identify a data access condition that may be leveraged to initiate data compliance operations, such as alerts, notification, data access restrictions, and/or the like, to enforce one or more data access constraints for an access controlled dataset. These predictive insights may be leveraged to automatically monitor and address complex data governance standards to improve data compliance in real time. Moreover, the data indicative of data access conditions, such as natural language condition descriptions, condition alerts, and/or the like, may be displayed as a visual rendering of the aforementioned examples to illustrate violations of one or more governing policies for a data set, and/or the like, for improving data compliance given constraints of a particular hierarchical organization and/or dataset.

Figure 8:
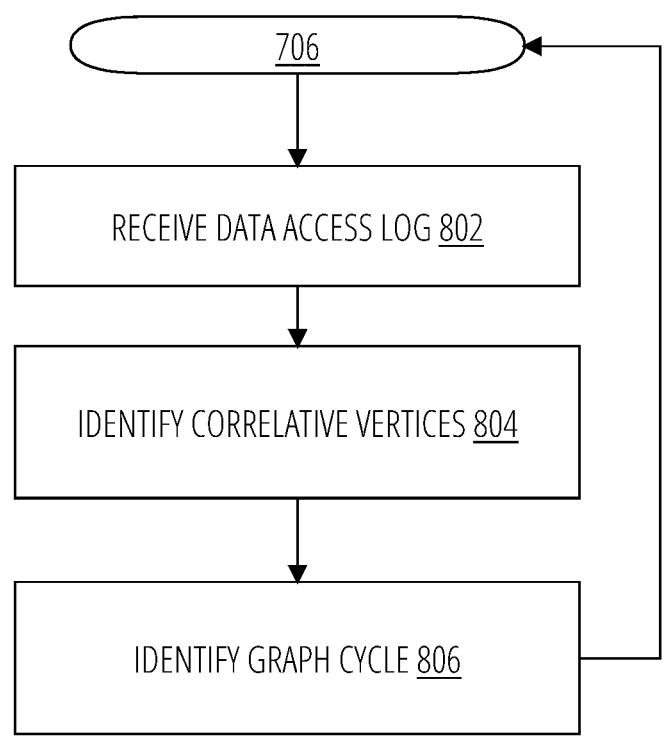
FIG. 8 is a flowchart showing an example of a process for identifying data access violation in accordance with some embodiments discussed herein.

FIG. 8 is a flowchart showing an example of a process 800 for identifying a data access violation in accordance with some embodiments discussed herein. The flowchart depicts a compliance monitoring and enforcement technique that overcomes various limitations associated with traditional data compliance techniques. The compliance monitoring and enforcement techniques may be implemented by one or more computing devices, entities, and/or systems described herein. For example, via the various steps/operations of the process 800, the computing system 100 may leverage the structure of a knowledge graph to identify data access violations in real time to overcome the various limitations with conventional compliance techniques that are unable to detect data access conditions efficiently enough for real time applications.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 includes a plurality of steps/operations subsequent to the step/operation 706 of process 700, where the process 700 includes identifying one or more data access conditions. In some examples, the process 800 may include one or more suboperations of step/operation 706.

In some embodiments, the process 800 includes, at step/operation 802, receiving data access logs. For example, the computing system 100 may receive the data access logs for an access controlled dataset. For instance, the computing system 100 may receive one or more data access logs indicative of one or more data interactions.

In some embodiments, the process 800 includes, at step/operation 804, identifying correlative vertices. For example, the computing system 100 may identify the one or more correlative vertices of the plurality of vertices based on the one or more data access logs. For instance, the computing system 100 may identify the correlative vertices based on the knowledge graph and a data interaction of the data access logs.

In some embodiments, the process 800 includes, at step/operation 806, identifying a graph cycle. For example, the computing system 100 may identify the graph cycle based on the correlative vertices. For instance, the computing system 100 may identify, using the knowledge graph, the graph cycle based on one or more correlative edges between the one or more correlative vertices. In some embodiments, the computing system may identify a data access violation in response to identifying the graph cycle.

Figure 9:
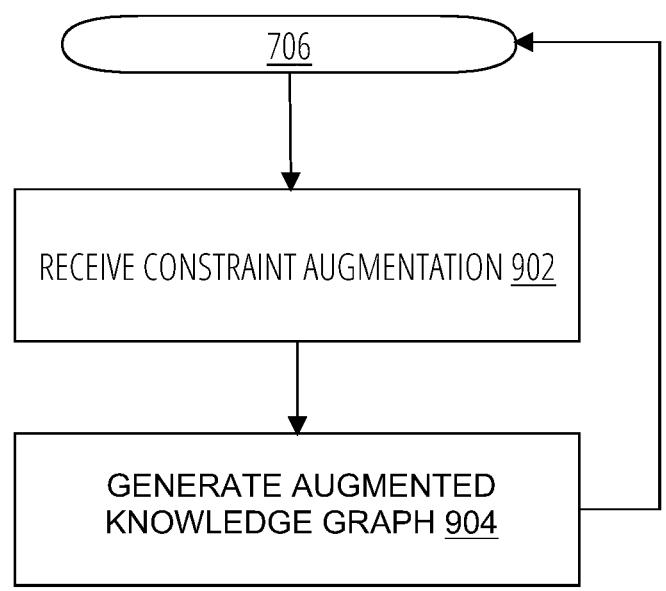
FIG. 9 is a flowchart showing an example of a process for identifying a data coverage violation in accordance with some embodiments discussed herein.

FIG. 9 is a flowchart showing an example of a process 900 for identifying a data coverage violation in accordance with some embodiments discussed herein. The flowchart depicts a compliance monitoring and enforcement technique that overcomes various limitations associated with traditional data compliance techniques. The compliance monitoring and enforcement techniques may be implemented by one or more computing devices, entities, and/or systems described herein. For example, via the various steps/operations of the process 900, the computing system 100 may leverage the structure of a knowledge graph to identify data coverage violations by simulating constraint augmentations to overcome the various limitations with conventional compliance techniques that are unable to effectively simulate augmentations to data access constraints to proactively address data coverage violations before the violations occur.

FIG. 9 illustrates an example process 900 for explanatory purposes. Although the example process 900 depicts a particular sequence of steps/operations, the sequence may be altered without departing from the scope of the present disclosure. For example, some of the steps/operations depicted may be performed in parallel or in a different sequence that does not materially impact the function of the process 900. In other examples, different components of an example device or system that implements the process 900 may perform functions at substantially the same time or in a specific sequence.

In some embodiments, the process 900 includes a plurality of steps/operations subsequent to the step/operation 706 of process 700, where the process 700 includes identifying one or more data access conditions. In some examples, the process 900 may include one or more suboperations of step/operation 706.

In some embodiments, the process 900 includes, at step/operation 902, receiving a constraint augmentation. For example, the computing system 100 may receive the constraint augmentation for a data access constraint. The constraint augmentation may be indicative of a new data access constraint, a modification to an existing data access constraint, and/or a removal of an existing data access constraint.

In some embodiments, the process 900 includes, at step/operation 904, generating an augmented knowledge graph. For example, the computing system 100 may generate the augmented knowledge graph based on the constraint augmentation. For instance, the computing system 100 may generate an augmented knowledge graph by modifying the knowledge graph based on the constraint augmentation.

In some embodiments, the computing system 100 may identify the data coverage violation based on the augmented knowledge graph. For example, the computing system 100 may receive one or more data access logs indicative of one or more data interactions. The computing system 100 may identify one or more correlative vertices from the augmented knowledge graph based on the one or more data interactions. The computing system 100 may identify the data coverage violation in response to a graph cycle corresponding to the one or more correlative vertices.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method, the computer-implemented method comprising generating, by one or more processors and using one or more natural language models, entity-relationship data for an access controlled dataset, wherein the entity-relationship data is indicative of one or more data access constraints for a plurality of dataset entities associated with the access controlled dataset; generating, by the one or more processors, a knowledge graph based on the entity-relationship data, wherein the knowledge graph comprises a plurality of vertices connected by a plurality of edges, wherein a vertex of the plurality of vertices is indicative of a dataset entity of the plurality of dataset entities and an edge of the plurality of edges is indicative of a potential interaction between two dataset entities of the plurality of dataset entities; identifying, by the one or more processors and using the knowledge graph, a data access condition indicative of a data access violation or a data coverage violation; generating, by the one or more processors and using the knowledge graph, a natural language condition description based on the data access condition; and providing, by the one or more processors, a condition alert indicative of the natural language condition description.

Example 2. The computer-implemented method of example 1, wherein the dataset entity is indicative of at least one of a natural language text, a hierarchical organization, a user, or a hierarchical geographic location, and the edge is indicative of at least a portion of a data access constraint defined by the natural language text.

Example 3. The computer-implemented method of any of the preceding examples, wherein the data access condition is the data access violation, and wherein identifying the data access violation comprises receiving one or more data access logs indicative of a plurality of data interactions; identifying one or more correlative vertices of the plurality of vertices based on a data interaction from the plurality of data interactions; identifying, using the knowledge graph, a graph cycle based on one or more correlative edges between the one or more correlative vertices; and identifying the data access violation in response to identifying the graph cycle.

Example 4. The computer-implemented method of example 3, wherein generating the natural language condition description comprises receiving one or more vertex descriptions corresponding to the one or more correlative vertices; and generating, using a generative model, the natural language condition description based on the one or more vertex descriptions.

Example 5. The computer-implemented method of examples 3 or 4 further comprising identifying a violation severity associated with the data access violation; generating a ranked list of violation conditions based on the violation severity; and providing the condition alert based on the ranked list of violation conditions.

Example 6. The computer-implemented method of any of examples 3 through 5, wherein the data interaction corresponds to a time stamp the data access condition is identified based on a graph version of the knowledge graph that corresponds to the time stamp, and wherein the computer-implemented method further comprises generating a violation timeline for the data access violation by identifying a plurality of historical data access conditions and a plurality of predictive data access conditions corresponding to the data access violation, wherein the plurality of historical data access conditions are identified based on a comparison between the graph cycle, the one or more data access logs, and a plurality of graph versions of the knowledge graph; and generating the condition alert based on the violation timeline.

Example 7. The computer-implemented method of any of examples 3 through 6, wherein the data interaction is a real-time data interaction and providing the condition alert indicative of the natural language condition description comprises identifying one or more violation locations associated with the data access violation; identifying one or more violation organizations associated with data access violation; generating the condition alert based on the one or more violation locations and the one or more violation organizations; identifying a data management team for the data access violation based on the one or more violation locations and the one or more violation organizations; and routing the condition alert to the data management team.

Example 8. The computer-implemented method of any of the preceding examples, wherein the data access condition is the data coverage violation, and wherein identifying the data coverage violation comprises receiving data indicative of a constraint augmentation for a data access constraint; generating an augmented knowledge graph by modifying the knowledge graph based on the constraint augmentation; and identifying the data coverage violation based on the augmented knowledge graph.

Example 9. The computer-implemented method of example 8, wherein identifying the data coverage violation comprises receiving one or more data access logs indicative of a plurality of data interactions; identifying one or more correlative vertices from the augmented knowledge graph based on a data interaction from the plurality of data interactions; and identifying the data coverage violation in response to a graph cycle corresponding to the one or more correlative vertices.

Example 10. The computer-implemented method of examples 8 or 9, wherein the constraint augmentation is indicative of a new data access constraint, a modification to an existing data access constraint, or a removal of the existing data access constraint.

Example 11. The computer-implemented method of any of the preceding examples, wherein generating the entity-relationship data for the access controlled dataset comprises generating, using the one or more natural language models, a plurality of data compliance rules from a plurality of natural language texts corresponding to the access controlled dataset, wherein a data compliance rule is indicative of (i) one or more dataset entities and (ii) one or more potential interactions between the one or more dataset entities.

Example 12. The computer-implemented method of example 11, wherein the data compliance rule is a structured language rule comprising a plurality of nouns, a plurality of verbs, and a plurality of adjectives, wherein (i) the plurality of nouns correspond to the one or more dataset entities and (ii) the plurality of verbs and the plurality of adjectives correspond to the one or more potential interactions.

Example 13. The computer-implemented method of example 12, wherein the plurality of nouns comprise one or more recognized nouns, and wherein generating the plurality of data compliance rules comprise extracting a noun from the plurality of natural language texts; generating, using a term linking model, a recognized noun based on a comparison between the noun and a recognized ontology; and assigning, using a classification model, an entity category to the recognized noun.

Example 14. A computing system comprising memory and one or more processors communicatively coupled to the memory, the one or more processors configured to generate, using one or more natural language models, entity-relationship data for an access controlled dataset, wherein the entity-relationship data is indicative of one or more data access constraints for a plurality of dataset entities associated with the access controlled dataset; generate a knowledge graph based on the entity-relationship data, wherein the knowledge graph comprises a plurality of vertices connected by a plurality of edges, wherein a vertex of the plurality of vertices is indicative of a dataset entity of the plurality of dataset entities and an edge of the plurality of edges is indicative of a potential interaction between two dataset entities of the plurality of dataset entities; identify, using the knowledge graph, a data access condition indicative of a data access violation or a data coverage violation; generate, using the knowledge graph, a natural language condition description based on the data access condition; and provide a condition alert indicative of the natural language condition description.

Example 15. The computing system of example 14, wherein the dataset entity is indicative of at least one of a natural language text, a hierarchical organization, a user, or a geographic location, and the edge is indicative of at least a portion of a data access constraint defined by the natural language text.

Example 16. The computing system of examples 14 or 15, wherein the data access condition is the data access violation, and wherein identifying the data access violation comprises receiving one or more data access logs indicative of a plurality of data interactions; identifying one or more correlative vertices of the plurality of vertices based on a data interaction from the plurality of data interactions; identifying, using the knowledge graph, a graph cycle based on one or more correlative edges between the one or more correlative vertices; and identifying the data access violation in response to identifying the graph cycle.

Example 17. The computing system of example 16, wherein generating the natural language condition description comprises receiving one or more vertex descriptions corresponding to the one or more correlative vertices; and generating, using a generative model, the natural language condition description based on the one or more vertex descriptions.

Example 18. The computing system of examples 16 or 17, wherein the one or more processors configured to identify a violation severity associated with the data access violation; generate a ranked list of violation conditions based on the violation severity; and provide the condition alert based on the ranked list of violation conditions.

Example 19. One or more non-transitory computer-readable storage media including instructions that, when executed by one or more processors, cause the one or more processors to generate, using one or more natural language models, entity-relationship data for an access controlled dataset, wherein the entity-relationship data is indicative of one or more data access constraints for a plurality of dataset entities associated with the access controlled dataset; generate a knowledge graph based on the entity-relationship data, wherein the knowledge graph comprises a plurality of vertices connected by a plurality of edges, wherein a vertex of the plurality of vertices is indicative of a dataset entity of the plurality of dataset entities and an edge of the plurality of edges is indicative of a potential interaction between two dataset entities of the plurality of dataset entities; identify, using the knowledge graph, a data access condition indicative of a data access violation or a data coverage violation; generate, using the knowledge graph, a natural language condition description based on the data access condition; and provide a condition alert indicative of the natural language condition description.

Example 20. The one or more non-transitory computer-readable storage media of example 19, wherein the data access condition is the data coverage violation, and wherein identifying the data coverage violation comprises receiving data indicative of a constraint augmentation for a data access constraint; generating an augmented knowledge graph by modifying the knowledge graph based on the constraint augmentation; and identifying the data coverage violation based on the augmented knowledge graph.

The invention claimed is:

1. A computer-implemented method comprising:
generating, by one or more processors and using a natural language model, entity-relationship data for an access-controlled dataset that identifies a data access constraint for a first dataset entity associated with the access-controlled dataset;
generating, by the one or more processors and based on the entity-relationship data, a knowledge graph that comprises a plurality of vertices and a plurality of edges, wherein (a) a vertex of the plurality of vertices identifies the first dataset entity of the access-controlled dataset and (b) an edge of the plurality of edges identifies a potential interaction between the first dataset entity and a second dataset entity associated with the access-controlled dataset;
identifying, by the one or more processors and using the knowledge graph, a data access condition associated with a data access violation or a data coverage violation;
identifying, by the one or more processors and using the knowledge graph, a violation severity associated with the data access condition based on a size of a graph cycle associated with the first dataset entity and the second dataset entity;
generating, by the one or more processors and using the knowledge graph, a natural language condition description based on the data access condition; and
providing, by the one or more processors and based on the violation severity, a condition alert that identifies the natural language condition description.

2. The computer-implemented method of claim 1, wherein the first dataset entity is indicative of at least one of a natural language text, a hierarchical organization, a user, or a hierarchical geographic location, and the edge is indicative of at least a portion of the data access constraint defined by the natural language text.

3. The computer-implemented method of claim 1, wherein the data access condition is associated with the data access violation, and wherein identifying the data access condition comprises:
receiving a data access log indicative of a data interaction;
identifying a correlative vertex of the plurality of vertices based on the data interaction;

identifying, using the knowledge graph, the graph cycle based on a correlative edge, of the plurality of edges, connected to the correlative vertex; and identifying the data access condition in response to identifying the graph cycle.

4. The computer-implemented method of claim 3, wherein generating the natural language condition description comprises:

receiving a vertex description corresponding to the correlative vertex; and generating, using a generative model, the natural language condition description based on the vertex description.

5. The computer-implemented method of claim 1 further comprising:

generating a ranked list of violation conditions based on the violation severity; and providing the condition alert based on the ranked list of violation conditions.

6. The computer-implemented method of claim 3, wherein the data interaction corresponds to a time stamp, the data access condition is identified based on a graph version of the knowledge graph that corresponds to the time stamp, and wherein the computer-implemented method further comprises:

generating a violation timeline for the data access violation by identifying a historical data access condition and a predictive data access condition corresponding to the data access violation, wherein the historical data access condition is identified based on a comparison between the graph cycle, the data access log, and a plurality of graph versions of the knowledge graph; and generating the condition alert based on the violation timeline.

7. The computer-implemented method of claim 3, wherein the data interaction is a real-time data interaction and providing the condition alert indicative of the natural language condition description comprises:

identifying a violation location associated with the data access violation;

identifying a violation organization associated with the data access violation;

generating the condition alert based on the violation location and the violation organization;

identifying a data management team for the data access violation based on the violation location and the violation organization; and routing the condition alert to the data management team.

8. The computer-implemented method of claim 1, wherein the data access condition is associated with the data coverage violation, and wherein identifying the data access condition comprises:

receiving data indicative of a constraint augmentation for the data access constraint;

generating an augmented knowledge graph by modifying the knowledge graph based on the constraint augmentation; and identifying the data access condition based on the augmented knowledge graph.

9. The computer-implemented method of claim 8, wherein identifying the data access condition comprises:

receiving a data access log indicative of a data interaction;

identifying a correlative vertex from the augmented knowledge graph based on the data interaction; and identifying the data access condition in response to another graph cycle that corresponds to the correlative vertex.

10. The computer-implemented method of claim 8, wherein the constraint augmentation is indicative of a new data access constraint, a modification to an existing data access constraint, or a removal of the existing data access constraint.

11. The computer-implemented method of claim 1, wherein generating the entity-relationship data for the access controlled dataset comprises:

generating, using the natural language model, a data compliance rule from a natural language text corresponding to the access-controlled dataset, wherein the data compliance rule identifies (i) the first dataset entity and (ii) the potential interaction between the first dataset entity and the second dataset entity.

12. The computer-implemented method of claim 11, wherein the data compliance rule is a structured language rule comprising a noun, a verb, and an adjective, wherein (i) the noun corresponds to the first dataset entity and (ii) the verb and the adjective correspond to the potential interaction.

13. The computer-implemented method of claim 12, wherein the noun comprises a recognized noun, and wherein generating the data compliance rule comprises:

extracting the noun from the natural language text;

generating, using a term linking model, the recognized noun based on a comparison between the noun and a recognized ontology; and assigning, using a classification model, an entity category to the recognized noun.

14. A computing system comprising memory and one or more processors communicatively coupled to the memory, the one or more processors configured to:

generate, using a natural language model, entity-relationship data for an access-controlled dataset that identifies a data access constraint for a first dataset entity associated with the access-controlled dataset;

generate, based on the entity-relationship data, a knowledge graph that comprises a plurality of vertices and a plurality of edges, wherein (a) a vertex of the plurality of vertices identifies the first dataset entity of the access-controlled dataset and (b) an edge of the plurality of edges identifies a potential interaction between the first dataset entity and a second dataset entity associated with the access-controlled dataset;

identify, using the knowledge graph, a data access condition associated with a data access violation or a data coverage violation;

identifying, by the one or more processors and using the knowledge graph, a violation severity associated with the data access condition based on a size of a graph cycle associated with the first dataset entity and the second dataset entity;

generate, using the knowledge graph, a natural language condition description based on the data access condition; and provide, based on the violation severity, a condition alert that identifies the natural language condition description.

15. The computing system of claim 14, wherein the first dataset entity is indicative of at least one of a natural language text, a hierarchical organization, a user, or a hierarchical geographic location, and the edge is indicative of at least a portion of the data access constraint defined by the natural language text.

16. The computing system of claim 14, wherein the data access condition is associated with the data access violation, and wherein identifying the data access condition comprises:

receiving a data access log indicative of a data interaction;

identifying a correlative vertex of the plurality of vertices based on the data interaction;

identifying, using the knowledge graph, the graph cycle based on a correlative edge, of the of the plurality of edges, connected to the correlative vertex; and identifying the data access condition in response to identifying the graph cycle.

17. The computing system of claim 16, wherein generating the natural language condition description comprises:

receiving a vertex description corresponding to the correlative vertex; and generating, using a generative model, the natural language condition description based on the vertex description.

18. The computing system of claim 14, wherein the one or more processors are further configured to:

generate a ranked list of violation conditions based on the violation severity; and provide the condition alert based on the ranked list of violation conditions.

19. One or more non-transitory computer-readable storage media including instructions that, when executed by one or more processors, cause the one or more processors to:

generate, using a natural language model, entity-relationship data for an access-controlled dataset that identifies a data access constraint for a first dataset entity associated with the access-controlled dataset;

generate, based on the entity-relationship data, a knowledge graph that comprises a plurality of vertices and a plurality of edges, wherein (a) a vertex of the plurality of vertices identifies the first dataset entity of the access-controlled dataset and (b) an edge of the plurality of edges identifies a potential interaction between the first dataset entity and a second dataset entity associated with the access-controlled dataset;

identify, using the knowledge graph, a data access condition associated with a data access violation or a data coverage violation;

identifying, by the one or more processors and using the knowledge graph, a violation severity associated with the data access condition based on a size of a graph cycle associated with the first dataset entity and the second dataset entity;

generate, using the knowledge graph, a natural language condition description based on the data access condition; and provide, based on the violation severity, a condition alert that identifies the natural language condition description.

20. The one or more non-transitory computer-readable storage media of claim 19, wherein the data access condition is associated with the data coverage violation, and wherein identifying the data access condition comprises:

receiving data indicative of a constraint augmentation for the data access constraint;

generating an augmented knowledge graph by modifying the knowledge graph based on the constraint augmentation; and identifying the data access condition based on the augmented knowledge graph.

* * * * *

UNITED STATES PATENT AND TRADEMARK OFFICE
CERTIFICATE OF CORRECTION

PATENT NO. : 12,271,498 B2
APPLICATION NO. : 18/452768
DATED : April 8, 2025
INVENTOR(S) : Donald E. Johnson, Jr. et al.

Page 1 of 1

It is certified that error appears in the above-identified patent and that said Letters Patent is hereby corrected as shown below:

In the Claims

In Column 42, Lines 7-8, Claim 11, delete "access controlled" and insert -- access-controlled --, therefor.

In Column 42, Line 52, Claim 14, delete "entity:" and insert -- entity; --, therefor.

In Column 43, Line 5, Claim 16, delete "of the of the" and insert -- of the --, therefor.

Signed and Sealed this
Nineteenth Day of August, 2025

Coke Morgan Stewart
*Acting Director of the United States Patent and Trademark Office*